(12) United States Patent (10) Patent No.: US 8,271,157 B2
Yamaguchi (45) Date of Patent: Sep. 18, 2012

(54) MOBILE MECHANISM, MEMBER FOR MOBILE MECHANISM AND CONTROL METHOD FOR MOBILE MECHANISM

(76) Inventor: Hiroaki Yamaguchi, Tokyo (JP)

( * ) Notice: Subject to any disclaimer, the term of this patent is extended or adjusted under 35 U.S.C. 154(b) by 1861 days.

(21) Appl. No.: 11/421,001

(22) Filed: May 30, 2006

(65) Prior Publication Data

US 2006/0269387 A1 Nov. 30, 2006

(30) Foreign Application Priority Data

May 30, 2005 (JP) .................................. 2005-185684

(51) Int. Cl.
*G01C 22/00* (2006.01)
(52) U.S. Cl. ........................... 701/23; 700/245; 414/729
(58) Field of Classification Search .................... 701/23; 700/245; 414/729; 74/490
See application file for complete search history.

(56) References Cited

U.S. PATENT DOCUMENTS

| | | | | |
|---|---|---|---|---|
| 4,907,937 A * | 3/1990 | Milenkovic | .................... | 414/735 |
| 5,193,963 A * | 3/1993 | McAffee et al. | .................. | 414/5 |
| 5,355,743 A * | 10/1994 | Tesar | ........................ | 74/490.03 |
| 6,430,475 B2 * | 8/2002 | Okamoto et al. | ............. | 700/245 |
| 6,668,211 B1 * | 12/2003 | Fujita et al. | .................... | 700/245 |
| 6,671,582 B1 * | 12/2003 | Hanley | .......................... | 700/245 |
| 6,684,127 B2 * | 1/2004 | Fujita et al. | .................... | 700/245 |
| 6,711,469 B2 * | 3/2004 | Sakamoto et al. | ............ | 700/245 |
| 6,728,598 B2 * | 4/2004 | Fujita et al. | .................... | 700/245 |
| 6,760,646 B2 * | 7/2004 | Osawa | .......................... | 700/245 |
| 6,785,590 B2 * | 8/2004 | Kasuga et al. | ................. | 700/245 |
| 6,922,610 B2 * | 7/2005 | Okamoto et al. | ............. | 700/245 |
| 7,327,112 B1 * | 2/2008 | Hlynka et al. | ........... | 318/568.12 |
| 2003/0208303 A1 * | 11/2003 | Okamoto et al. | ............. | 700/245 |

OTHER PUBLICATIONS

Shigeo Hirose, "Seibutsu Kikai Kougaku" (Biomechanics), 1987, Kogyouchousakai Publishing Co. Ltd.
Shigeo Hirose, "Biologically Inspired Robots (Snake-like Locomotors and Manipulators)", 1993, Oxford Univeristy Press.
J.P. Ostrowski and J.W. Burdick, "The Geometric Mechanics of Undulatory Robotic Locomotion", International Journal of Robotics Research, 1998, vol. 17, No. 17, 683/701.
Shigeo Hirose and Hiroki Takeuchi, "Roller-Walker: A New Leg-Wheel Hybrid Mobil Robot", Transactions of the Japan Society of Mechanical Engineers (C Ed.), 1996, vol. 62, No. 599, 2758/2764.
Yasushi Iwatami, Masato Ishikawa, and Shinji Hara, "Analysis and Control of a Trident Snake-Like Mobil Robot," Transactions of Instrument and Control Engineers, 2003, vol. 39, No. 12, 1159/1161.
Yoshikatsu Hoshi, Mitsuji Sampei and Masanobu Koga, "An Autonomous Locomotion Control of a Multi-Joint Snake-Like Robot with Consideration of the Dynamic Manipulability", Journal of the Robotics Society of Japan, 2000, vol. 18, No. 18, 1133/1140.
Gen Endo and Shiego Hirose, "Study on Roller-Walker—System Integration and Basic Experiments-", Journal of the Robotics Society of Japan, 2000, vol. 18, No. 2, 270/277.
Gen Endo and Shiego Hirose, "Study on Roller-Walker—Multimode Steering Control and Self-contained Locomotion", Journal of the Robotics Society of Japan, 2000, vol. 18, No. 18, 1159/1165.

* cited by examiner

*Primary Examiner* — Helal A Algahaim
(74) *Attorney, Agent, or Firm* — Miles & Stockbridge P.C.

(57) ABSTRACT

A steering mechanism is provided on an equilateral triangular base of a mobile mechanism, and three joints are attached to the base at the three vertexes thereof. Links are attached to the three joints respectively. On each link is provided a steering mechanism. The equilateral triangular base of the mobile mechanism is moved or rotated by periodically driving the three joints while steering the four steering mechanisms.

2 Claims, 17 Drawing Sheets t=0.0−4.5 [sec]

(a) t=0.0 [sec]

(b) t=0.5 [sec]

(c) t=1.0 [sec]

(d) t=1.5 [sec]

(e) t=2.0 [sec]

(f) t=2.5 [sec]

(g) t=3.0 [sec]

(h) t=3.5 [sec]

(i) t=4.0 [sec]

(j) t=4.5 [sec]

(A) $g_{16}-g_{18}$ (B) $g_{110}-g_{18}$ (C) $g_{112}-g_{18}$

5-CHAIN
→FIVE-CHAIN, SINGLE-GENERATOR CHAINED FORM

4-CHAIN
→FOUR-CHAIN, SINGLE-GENERATOR CHAINED FORM

BASE PORTION

EQUATIONS CAN BE CONVERTED INTO MULTI-CHAIN, SINGLE-GENERATOR CHAINED FORM

EQUATIONS CAN BE CONVERTED INTO MULTI-CHAIN, SINGLE-GENERATOR CHAINED FORM

COAXIAL JOINT
LINK STEERING MECHANISM
LINK MEMBER

⊥ : PASSIVE WHEELS
(ALL HAVING STEERING
MECHANISM)

⊥ : PASSIVE WHEELS
(HAVING STEERING MECHANISM,
UNLESS SPECIFIED OTHERWISE)

⊥ : PASSIVE WHEELS
(HAVING STEERING MECHANISM),
PROVIDED ON EVERY TWO
SUCCESSIVE MEMBERS
(ALTERNATIVELY, ON EVERY THREE
OR MORE SUCCESSIVE MEMBERS)

EQUATIONS CAN BE CONVERTED INTO MULTI-CHAIN, SINGLE-GENERATOR CHAINED FORM

EQUATIONS CAN BE CONVERTED INTO MULTI-CHAIN, SINGLE-GENERATOR CHAINED FORM

EQUATIONS CAN BE CONVERTED INTO MULTI-CHAIN, SINGLE-GENERATOR CHAINED FORM

EQUATIONS CAN BE CONVERTED INTO MULTI-CHAIN, SINGLE-GENERATOR CHAINED FORM

EQUATIONS CAN BE CONVERTED INTO MULTI-CHAIN, SINGLE-GENERATOR CHAINED FORM

MOBILE MECHANISM, MEMBER FOR MOBILE MECHANISM AND CONTROL METHOD FOR MOBILE MECHANISM

FIELD OF THE INVENTION

The present invention relates to a mobile mechanism, a member for use in a mobile mechanism and a control method for a mobile mechanism, and in particular to a mobile mechanism that is adapted to, at least, move or turn while performing undulatory locomotion, a member for such a mobile mechanism and a method of controlling such a mobile mechanism.

BACKGROUND ART

How to design a mobile mechanism and how to control the mobile mechanism are important research issues in the field of mechanical engineering. Heretofore, there have been proposed mobile mechanisms that move by undulatory locomotion, such as a snake-like robot (see documents 1 and 2 in the document list presented below), a snake board (see document 3), a roller walker (see document 4) and a snake-like mobile robot (see document 5).

The aforementioned snake-like robot disclosed in documents 1 and 2 is constructed by joining a plurality of links on which passively turning wheels are attached. Movement of the snake-like robot is realized by driving joints between the links. The undulatory locomotion is a motion resulting from changes in the shape of a mobile mechanism, as is the case with the snake-like robot.

The aforementioned snake board (see document 3) has a rigid body having a moment of inertia that rotates about the center of gravity of the vehicle. In addition, it has passively turning front and rear wheels provided on the vehicle. Both the front and rear wheels are provided with a steering function. Movement of the snake board is realized by rotating the rigid body having a moment of inertia while operating the two steering mechanisms.

In the aforementioned roller walker (see document 4), passively turning wheels are attached at the ends of the legs of a four-legged robot, where its movement is realized by driving the joints of the legs.

The aforementioned three-branched snake-like mobile robot (see document 5) has a structure in which links on which passively turning wheels are attached, by means of joints, to the vertexes of a base having an equilateral triangle shape. The structure of this tree-branched snake-like mobile robot has been designed with a view to research specific properties of kinematic equations thereof. For this reason, although movement of the three-branched snake-like robot is realized by driving joints, its movement is intermittent unlike with the aforementioned snake-like robot, snake board and roller walker that can move smoothly, and improvement of the three branched snake-like robot is desired.

In order to realize stable operation of the snake-like robot, the snake board, the roller walker and the three-branched snake-like mobile robot, a closed loop control system, such as a feedback control system for realizing a target position and a target posture in an asymptotically stable way or a feedback control system for causing a mechanism to follow a straight or curved path (or a track) is required.

Heretofore, a feedback control system that causes a snake-like robot to follow a target track based on kinematic equations thereof has been proposed (see document 6). However, it is necessary to devise a feedback control system for causing not only snake-like robots but also other mobile mechanisms that perform undulatory locomotion to follow a target path (or a track).

(Document List)
[Document 1] Shigeo Hirose, "Seibutsu Kikai Kougaku" (Biomechanics), Kogyouchousakai Publishing Co. Ltd., (1987).
[Document 2] S. hirose, "Biologically Inspired Robots (Snake-like Locomotor and Manipulator)", Oxford University Press, (1993).
[Document 3] J. P. Ostrowski and J. W. Burdick, "The Geometric Mechanics of Undulatory Robotic Locomotion", International Journal of Robotics Research, vol. 17, no. 7, 683/701, (1998).
[Document 4] Shigeo Hirose and Hiroki Takeuchi, "Roller-Walker: A New Leg-Wheel Hybrid Mobile Robot", Transactions of the Japan Society of Mechanical Engineers (C Ed.), vol. 62, no. 599, 2758/2764, (1996).
[Document 5] Yasushi Iwatani, Masato Ishikawa and Shinji Hara, "Analysis and Control of a Trident Snake-Like Mobile Robot", Transactions of Instrument and Control Engineers, vol. 39, no. 12, 1159/1161, (2003).
[Document 6] Yoshikatsu Hoshi, Mitsuji Sampei and Masanobu Koga: "An Autonomous Locomotion Control of a Multi-Joint Snake-Like Robot with Consideration of the Dynamic Manipulability", Journal of the Robotics Society of Japan, vol. 18, no. 8, 1133/1140, (2000)

SUMMARY OF THE INVENTION

The present invention has been made in view of the above-described circumstances, and has as an object to provide a mobile mechanism utilizing undulatory locomotion that can move smoothly. A further object of the present invention is to provided a member suitably used in such a mobile mechanism. A still further object of the present invention is to provide a control method that can cause, for example, such a mobile mechanism to follow a target path (or a track).

To achieve the object, according to the present invention, there is provided a member for use in a mobile mechanism. The member is mounted as a component of a mobile mechanism in such a way that it can swing about a certain swing axis. On this member is provided a steering mechanism that can steer a passive element relative to the member about a steer axis extending in a direction intersecting the plane of swinging of the member. Thus, it is possible to provide a member that is suitable for use in a mobile mechanism that can realize smooth motion utilizing undulatory locomotion.

A mobile mechanism according to the present invention comprises a plurality of members connected via joints and a steering mechanism provided on at least one of the plurality of members that enables steering of a passive element relative to a corresponding member. The mobile mechanism is at least moved or rotated by causing the plurality of members to swing about pivot axes provided by the joints.

By the above described arrangement, it is possible to realize smooth movement (or positional displacement) and rotation of the mobile mechanism that performs undulatory locomotion in any environment (e.g. on the ground, on the surface of the water or on the ice) in which there is action and reaction acting between the passive element (or steering element) of the steering mechanism and something in contact therewith. The above-mentioned plurality of members include, for example, a link member(s) and a base portion of the mobile mechanism. However, the member are not limited to them, and they may be other types of members.

The mobile mechanism according to the present invention includes an arrangement in which the plurality of members are connected in a row, an arrangement in which the plurality of members are connected to form a closed loop, an arrangement in which the plurality of members are connected to form multiple branches, and an arrangement in which the plurality of members are connected by coaxially provided joints.

In the mobile mechanism according to the present invention, the above-mentioned steering mechanism(s) may be provided on all of the members, or on at least every two members. In addition, a member or a series of members equipped with a steering mechanism and a member or a series of members equipped with no steering mechanism may be arranged alternately.

The mobile mechanism according to the present invention may be constructed in such a way as to include at least one member on which the aforementioned steering mechanism and the aforementioned passive element are provided.

The mobile mechanism according to the present invention may be constructed in such a way that a passive element is provided on at least one member on which the aforementioned steering mechanism is not provided.

It has been difficult to convert kinematic equations of a mobile mechanism having an off-hook type structure into chained form. The inventor discovered that conversion of kinematic equations of mobile mechanisms having an off-hook type structure into multi-chain, single-generator chained form can be made possible by assuming the presence of virtual mechanical elements (such as a virtual joint, a virtual member, a virtual passive element (which includes a virtual axle of a virtual link member, a virtual passive wheel mounted on such a virtual axle) and a virtual steering mechanism). By controlling swinging of the members and steering of the passive element of the steering mechanism based on the multi-chain, single-generator chained form after the conversion, it is possible to realize feedback control for the mobile mechanism having an off-hook type structure by a simple system.

According to the above-described discovery made by the inventor, in various types of mobile mechanisms, it is possible to convert the kinematic equations of a mobile mechanism into multi-chain, single-generator chained form by assuming the presence of suitable virtual mechanical elements attached to the mobile mechanism. This can be said for various types of mobile systems. For example, in mobile systems in which a plurality of members are connected by means of joints in various ways, it is possible to convert the kinematic equations thereof into multi-chain, single-generator chained form by assuming the presence of virtual mechanical elements as shown in FIGS. 3, 4, 9 and 11 to 15. Thus, it is possible to control the mobile mechanism by a simple system. In addition, by constructing a mobile mechanism in such a way that the kinematic equations thereof can be converted into multi-chain, single-generator chained form, it is made possible to control the mobile mechanism by a simple system based on the multi-chain, single-generator chained form.

Accordingly, there are various modes of control methods for a mobile mechanism according to the present invention as described in the following.

According to one aspect of the present invention, there is provided a control method for a mobile mechanism including a plurality of members connected via joints and a steering mechanism provided on at least one of said plurality of members that enables steering of a passive element relative to the corresponding member, the mobile mechanism being at least moved or rotated by causing said plurality of members to swing about pivot axes provided by the joints, the method comprising arranging the mobile mechanism in such a way that a kinematic equation of the mobile mechanism can be converted into multi-chain, single-generator chained form, and controlling swinging of said members and steering of the passive element of said steering mechanism based on the multi-chain, single-generator chained form.

According to another aspect of the present invention, there is provided a control method for a mobile mechanism including a plurality of members connected via joints and a steering mechanism provided on at least one of said plurality of members that enables steering of a passive element relative to the corresponding member, the mobile mechanism being at least moved or rotated by causing said plurality of members to swing about pivot axes provided by the joints, the method comprising:

assuming the presence of a virtual mechanical element attached to said mobile mechanism, the virtual mechanical element including at least one of a virtual joint, a virtual member, a virtual steering mechanism and a virtual passive element or a combination of them, whereby a kinematic equation of the mobile mechanism can be converted into multi-chain, single-generator chained form; and controlling swinging of said members and steering of the passive element of said steering mechanism based on the multi-chain, single-generator chained form.

According to a further aspect of the present invention, there is provided a control method for a mobile mechanism including a plurality of members connected via joints and a steering mechanism provided on at least one of said plurality of members that enables steering of a passive element relative to the corresponding member, the mobile mechanism being at least moved or rotated by causing said plurality of members to swing about pivot axes provided by the joints, the method comprising:

assuming the presence of a virtual steering mechanism(s) provided on all or some of said plurality of members, said virtual steering mechanism including a virtual passive steering element that can be steered relative to the corresponding member, whereby a kinematic equation of the mobile mechanism can be converted into multi-chain, single-generator chained form; and controlling swinging of said members and steering of the passive element of said steering mechanism based on the multi-chain, single-generator chained form.

According to still further aspect of the present invention, there is provided a control method for a mobile mechanism including a plurality of members connected via joints and a steering mechanism provided on at least one of said plurality of members that enables steering of a passive element relative to the corresponding member, the mobile mechanism being at least moved or rotated by causing said plurality of members to swing about pivot axes provided by the joints, the method comprising:

assuming the presence of a virtual passive element(s) provided on all or some of said plurality of members, whereby a kinematic equation of the mobile mechanism can be converted into multi-chain, single-generator chained form; and controlling swinging of said members and steering of the passive element of said steering mechanism based on the multi-chain, single-generator chained form.

According to still further aspect of the present invention, there is provided a control method for a mobile mechanism including a plurality of members connected via joints and a steering mechanism provided on at least one of said plurality of members that enables steering of a passive element relative to a corresponding member, the mobile mechanism being at least moved or rotated by causing said plurality of members to swing about pivot axes provided by the joints, the method comprising:

assuming the presence of a virtual steering mechanism(s) or a virtual passive element(s) on all or some of said plurality of members, said virtual steering mechanism including a virtual passive steering element that can be steered relative to the corresponding member, whereby a kinematic equation of the mobile mechanism can be converted into multi-chain, single-generator chained form; and controlling swinging of said members and steering of the passive element of said steering mechanism based on the multi-chain, single-generator chained form.

According to still further aspect of the present invention, there is provided a control method for a mobile mechanism including a plurality of members connected via joints and a steering mechanism provided on at least one of said plurality of members that enables steering of a passive element relative to a corresponding member, the mobile mechanism being at least moved or rotated by causing said plurality of members to swing about pivot axes provided by the joints, the method comprising:

assuming the presence of virtual mechanical elements attached to said mobile mechanism, the virtual mechanical elements including a virtual joint, a virtual member, a first virtual steering mechanism, a second virtual steering mechanism and a virtual passive element, wherein said virtual joint is provided between said mobile mechanism and said virtual member or between said plurality of members and said virtual member, said virtual member is connected to said mobile mechanism via said virtual joint, or connected in such a way as to bridge said plurality of members, said first virtual steering mechanism is provided on said virtual member and includes a virtual passive steering element that can be steered relative to said virtual member, said second virtual steering mechanism or said virtual passive element is provided on all or some of said plurality of members, and said second virtual steering mechanism includes a virtual passive steering element that can be steered relative to the corresponding member, whereby a kinematic equation of the mobile mechanism can be converted into multi-chain, single-generator chained form; and controlling swinging of said members and steering of the passive element of said steering mechanism based on the multi-chain, single-generator chained form.

Here, the description that said virtual joint is provided between said plurality of members and said virtual member and said virtual member is connected via said virtual joint in such a way as to bridge said plurality of members means for example that it is assumed that said virtual member is attached between open ends of two members each having an open end by means of said virtual joints. By assuming the presence of virtual mechanical elements as per the above also, it is possible to convert a kinematic equation of the mobile mechanism into multi-chain, single-generator chained form. Thus, it is possible to control swinging of said members and steering of the passive element of said steering mechanism based on the multi-chain, single-generator chained form.

According to a still further aspect of the present invention, there is provided a control method for a mobile mechanism including a plurality of members connected via joints and a steering mechanism provided on at least one of said plurality of members that enables steering of a passive element relative to a corresponding member, the mobile mechanism being at least moved or rotated by causing said plurality of members to swing about pivot axes provided by the joints, the method comprising:

assuming the presence of virtual mechanical elements attached to said mobile mechanism, the virtual mechanical elements including a virtual joint, a virtual member, a first virtual steering mechanism, a second virtual steering mechanism and a virtual passive element, wherein said virtual joint is provided between said mobile mechanism and said virtual member or between said plurality of members and said virtual member, said virtual member is connected to said mobile mechanism via said virtual joint, or connected in such a way as to bridge said plurality of members, said first virtual steering mechanism is provided on said virtual member and includes a virtual passive steering element that can be steered relative to said virtual member, said second virtual steering mechanism or said virtual passive element is provided on all or some of said plurality of members, and said second virtual steering mechanism includes a virtual passive steering element that can be steered relative to the corresponding member, whereby a kinematic equation of the mobile mechanism can be converted into multi-chain, single-generator chained form; and controlling swinging of said members and steering of the passive element of said steering mechanism based on the multi-chain, single-generator chained form.

According to a still further aspect of the present invention, there is provided a control method for a mobile mechanism including a plurality of members connected via joints and a steering mechanism provided on at least one of said plurality of members that enables steering of a passive element relative to a corresponding member, the mobile mechanism being at least moved or rotated by causing said plurality of members to swing about pivot axes provided by the joints, the method comprising:

assuming the presence of virtual mechanical elements attached to said mobile mechanism, the virtual mechanical elements including a virtual joint, a virtual member, a first virtual passive element, a virtual steering mechanism and a second virtual passive element, wherein said virtual joint is provided between said mobile mechanism and said virtual member or between said plurality of members and said virtual member, said virtual member is connected to said mobile mechanism via said virtual joint, or connected in such a way as to bridge said plurality of members, said first virtual passive element is provided on said virtual member, said virtual steering mechanism or said second virtual passive element is provided on all or some of said plurality of members, and said virtual steering mechanism includes a virtual passive steering element that can be steered relative to the corresponding member, whereby a kinematic equation of the mobile mechanism can be converted into multi-chain, single-generator chained form; and controlling swinging of said members and steering of the passive element of said steering mechanism based on the multi-chain, single-generator chained form.

According to a still further aspect of the present invention, there is provided a control method for a mobile mechanism including a plurality of members connected via joints and a steering mechanism provided on at least one of said plurality of members that enables steering of a passive element relative to a corresponding member, the mobile mechanism being at least moved or rotated by causing said plurality of members to swing about pivot axes provided by the joints, the method comprising:

assuming the presence of virtual mechanical elements attached to said mobile mechanism, the virtual mechanical elements including a virtual joint, a virtual member, a first virtual passive element, a virtual steering mechanism and a second virtual passive element, wherein said virtual joint is provided between said mobile mechanism and said virtual member or between said plurality of members and said virtual member, said virtual member is connected to said mobile mechanism via said virtual joint, or connected in such a way as to bridge said plurality of members, said first virtual passive element is provided on said virtual member, said virtual steering mechanism or said second virtual passive element is provided on all or some of said plurality of members, and said virtual steering mechanism includes a virtual passive steering element that can be steered relative to the corresponding member, whereby a kinematic equation of the mobile mechanism can be converted into multi-chain, single-generator chained form; and controlling swinging of said members and steering of the passive element of said steering mechanism based on the multi-chain, single-generator chained form.

According to a still further aspect of the present invention, there is provided a control method for a mobile mechanism including a plurality of members connected via joints and a steering mechanism provided on at least one of said plurality of members that enables steering of a passive element relative to a corresponding member, the mobile mechanism being at least moved or rotated by causing said plurality of members to swing about pivot axes provided by the joints, the method comprising:

assuming the presence of virtual mechanical elements attached to said mobile mechanism, the virtual mechanical elements including a virtual joint, a virtual member, a first virtual steering mechanism, a first virtual passive element, a second virtual steering mechanism and a second virtual passive element, wherein said virtual joint is provided between said mobile mechanism and said virtual member or between said plurality of members and said virtual member, said virtual member is connected to said mobile mechanism via said virtual joint, or connected in such a way as to bridge said plurality of members, said first virtual steering mechanism is provided on said virtual member and includes a virtual passive steering element that can be steered relative to said virtual member, said first virtual passive element is provided on said virtual member, said second virtual steering mechanism or said second virtual passive element is provided on all or some of said plurality of members, and said second virtual steering mechanism includes a virtual passive steering element that can be steered relative to the corresponding member, whereby a kinematic equation of the mobile mechanism can be converted into multi-chain, single-generator chained form; and controlling swinging of said members and steering of the passive element of said steering mechanism based on the multi-chain, single-generator chained form.

According to a still further aspect of the present invention, there is provided a control method for a mobile mechanism including a plurality of members connected via joints and a steering mechanism provided on at least one of said plurality of members that enables steering of a passive element relative to a corresponding member, the mobile mechanism being at least moved or rotated by causing said plurality of members to swing about pivot axes provided by the joints, the method comprising:

assuming the presence of virtual mechanical elements attached to said mobile mechanism, the virtual mechanical elements including a virtual joint, a virtual member, a first virtual steering mechanism, a first virtual passive element, a second virtual steering mechanism and a second virtual passive element, wherein said virtual joint is provided between said mobile mechanism and said virtual member or between said plurality of members and said virtual member, said virtual member is connected to said mobile mechanism via said virtual joint, or connected in such a way as to bridge said plurality of members, said first virtual steering mechanism is provided on said virtual member and includes a virtual passive steering element that can be steered relative to said virtual member, said first virtual passive element is provided on said virtual member, said second virtual steering mechanism or said second virtual passive element is provided on all or some of said plurality of members, and said second virtual steering mechanism includes a virtual passive steering element that can be steered relative to the corresponding member, whereby a kinematic equation of the mobile mechanism can be converted into multi-chain, single-generator chained form; and controlling swinging of said members and steering of the passive element of said steering mechanism based on the multi-chain, single-generator chained form.

In a control method for a mobile mechanism according to any one aspect of the present invention may further be characterized in that what provides steering of the passive element of one steering mechanism is replaced in calculation by said virtual joint, said virtual member is fixedly attached in calculation to the passive element of said one steering mechanism, the passive element of said one steering mechanism on which said virtual member is fixedly attached in calculation is replaced in calculation by said first virtual passive element, and the member on which said one steering mechanism is provided is replaced in calculation by said steering mechanism and the member on which said passive element is not provided.

In a control method for a mobile mechanism according to any one aspect of the present invention, said virtual joint may be provided between any one of said plurality of members and said virtual member.

In a control method for a mobile mechanism according to any one aspect of the present invention, said virtual joint may be provided coaxially with the joint of the mobile mechanism.

In a control method for a mobile mechanism according to any one aspect of the present invention, said virtual joint may be provided between said virtual member and a virtual member other than that virtual member.

In a control method for a mobile mechanism according to any one aspect of the present invention, said virtual joint may be provided coaxially with another virtual joint.

In the control methods according to the present invention, it is also possible to convert a kinematic equation of the mobile mechanism into multi-chain, single generator chained form by replacing, in calculation, a member, joint, passive element and/or steering mechanism that actually exist as components of the mobile mechanism by virtual mechanical elements, and swinging of said members and steering of the passive element of said steering mechanism may be controlled based on the multi-chain, single generator chained form.

Therefore, in a control method for a mobile mechanism according to any one aspect of the present invention, said member may be replaced in calculation by said virtual member, or said virtual member may be replaced in calculation by said member.

In a control method for a mobile mechanism according to any one aspect of the present invention, said joint may be replaced in calculation by said virtual joint, or said virtual joint may be replaced in calculation by said joint.

In a control method for a mobile mechanism according to any one aspect of the present invention, said steering mechanism may be replaced in calculation by said virtual steering mechanism, or said virtual steering mechanism may be replaced in calculation by said steering mechanism.

In a control method for a mobile mechanism according to any one aspect of the present invention, said passive element may be replaced in calculation by said virtual passive element, or said virtual passive element may be replaced in calculation by said passive element.

In a control method for a mobile mechanism according to any one aspect of the present invention, said what provides steering of said steering mechanism may be replaced in calculation by said virtual joint, or said virtual joint may be replaced in calculation by said what provides steering of said steering mechanism.

In a control method for a mobile mechanism according to any one aspect of the present invention, said joint may be replaced in calculation by said what provides steering of said virtual steering mechanism, or said what provides steering of said virtual steering mechanism may be replaced in calculation by said joint.

In a control method for a mobile mechanism according to any one aspect of the present invention, said steering mechanism may be replaced in calculation by said virtual passive element, or said virtual passive element may be replaced in calculation by said steering mechanism.

In a control method for a mobile mechanism according to any one aspect of the present invention, said passive element may be replaced in calculation by said virtual steering mechanism, or said virtual steering mechanism may be replaced in calculation by said passive element.

A mobile mechanism according to any one aspect of the present invention may be controlled by one of the above described control methods according to the present invention.

The mobile mechanism according to the present invention may further include:

at least one joint provided on a base portion of the mobile mechanism;

a link member provided for each of said at least one joint and attached to said base portion by means of said at least one joint in such a way that it can swing about a pivot axis provided by said at least one joint, said pivot axis/axes extending substantially parallel to each other;

a link portion steering mechanism provided for said link member, the link portion steering mechanism being adapted to be capable of steering, relative to said link member, the direction of turning of a passive wheel that constitutes a passive element of said link portion steering mechanism about a steering axis that extending in a direction intersecting the plane of swinging of said link member;

a link actuator that provides a drive force for causing said link member to swing relative to said base portion about a pivot axis provided by said joint; and a link portion steering actuator that provides a drive force for steering the passive wheel of said link portion steering mechanism about said steering axis, wherein the mobile mechanism can at least be moved or rotated by driving said link actuator to cause said link member to swing and driving said link portion steering actuator to steer the passive wheel of said link portion steering mechanism.

This mobile mechanism may be adapted in such a way that a kinematic equation of the mobile mechanism is converted into multi-chain, single-generator chained form, and driving of said link actuator and said link portion steering actuator is controlled based on the multi-chain, single-generator chained form in accordance with a control method for a mobile mechanism according to any one aspect of the present invention.

This mobile mechanism may further include:

a base portion steering mechanism provided on said base portion, the base portion steering mechanism being adapted to be capable of steering, relative to said base member, the direction of turning of a passive wheel that constitutes a passive element of said base portion steering mechanism about a steering axis that extending in a direction intersecting the plane of swinging of said link member; and a base portion steering actuator that provides a drive force for steering the passive wheel of said base portion steering mechanism about said steering axis, wherein said base portion steering actuator is driven to steer the passive wheel of said base portion steering mechanism.

This mobile mechanism may be adapted in such a way that a kinematic equation of the mobile mechanism is converted into multi-chain, single-generator chained form, and driving of said link actuator and said link portion steering actuator is controlled based on the multi-chain, single-generator chained form in accordance with a control method for a mobile mechanism according to any one aspect of the present invention.

The mobile mechanism according to the present invention may be constructed in such a way that said plurality of members are caused to swing relative to each other at predetermined angular velocities and the passive element of said steering mechanism is steered at a predetermined angular velocity so that the mobile mechanism is at least moved along a predetermined path or rotated in a predetermined manner.

The mobile mechanism according to the present invention may further include control means for controlling swinging of said plurality of members and steering of the passive element of said steering mechanism.

The mobile mechanism according to the present invention may be constructed in such a way that said control means performs a feed forward control to cause said plurality of members to swing relative to each other at predetermined angular velocities and to steer the passive element of said steering mechanism at a predetermined angular velocity so that the mobile mechanism is at least moved along a predetermined path or rotated in a predetermined manner.

The mobile mechanism according to the present invention may be constructed in such a way that said control means performs a feedback control to correct said predetermined angular velocities based on the position and posture of the mobile mechanism, to cause said plurality of member to swing relative to each other and to steer the passive element of said steering mechanism based on angular velocities after the correction so that the mobile mechanism is at least moved along a predetermined path or rotated in a predetermined manner.

The present invention can provide a mobile mechanism utilizing undulatory locomotion that can move smoothly. The present invention can also provide a member that can be suitably used in such a mobile mechanism. In addition, the present invention can provide a control method for such a mobile mechanism, that can, for example, causes the mobile mechanism to follow a target path (or track) with a simple system.

DESCRIPTION OF THE PREFERRED EMBODIMENTS

Figure 1:
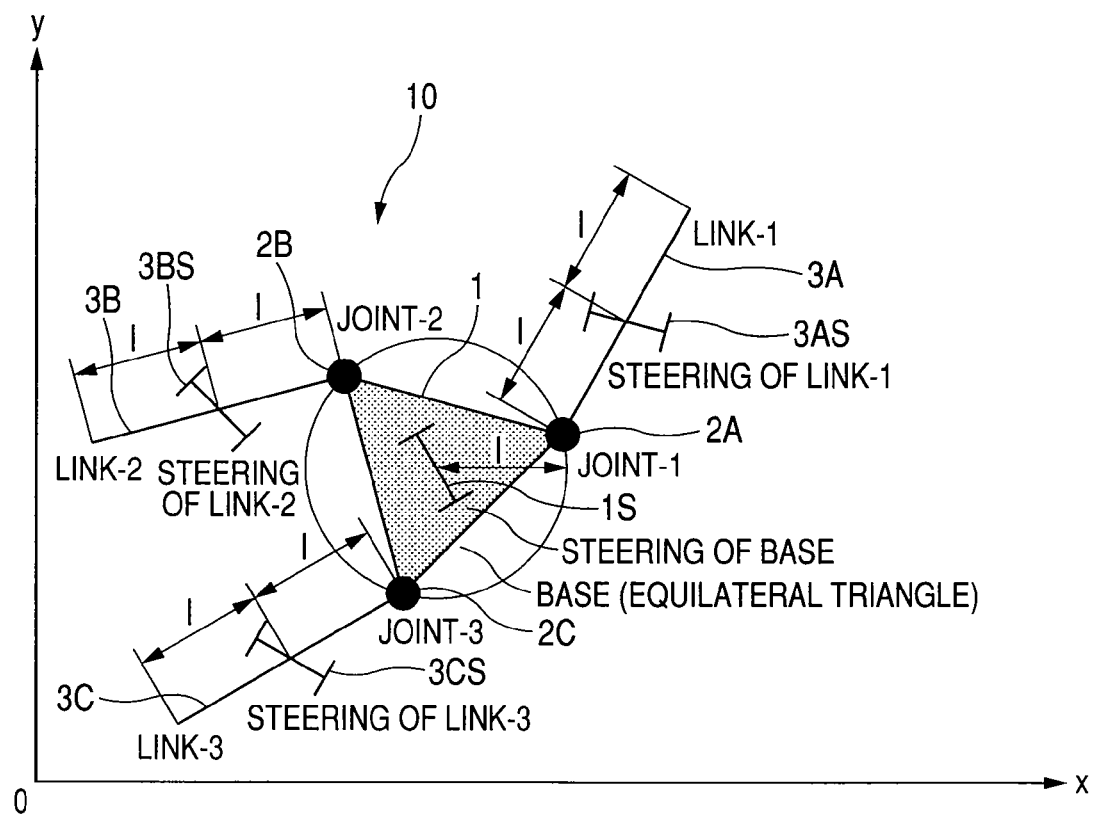
FIG. 1 is a diagram schematically showing the structure of a three-branched mobile mechanism according to an embodiment of the present invention.

As shown in FIG. 1, a three-branched mobile mechanism according to an embodiment of the present invention has an equilateral triangular base. At the center of gravity of the base is attached a steering mechanism. At each vertex of the equilateral triangular base is provided a link that is connected thereto via a joint. The link has a steering attached at the midpoint thereof. Movement of this mobile mechanism is realized by driving the three joints while operating the four steering mechanisms. The present invention proposes a feedback control method for causing the three-branched mobile mechanism to follow a straight path based on kinematic equations thereof. In particular, it can cause the three-branched mobile mechanism to follow a straight path smoothly.

This three-branched mobile mechanism is a kind of multiply-linked vehicle system. Other types of multiply-linked vehicle systems include a mobile robot towing multiple trailers (see Mitsuji Sampei and Tadaharu Kobayashi "Straight Path Tracking Control for Multiple Trailers Using Non-linear Control Theory" Journal of the Robotics Society of Japan, vol. 11, no. 4, 587/592, (1993), and C. Samson, "Control of Chained Systems: Application to Path Following and Time-Varying Point-Stabilization of Mobile Robots" IEEE Transactions on Automatic Control, vol. 40, no. 1, 64/77, (1995)), a mobile robot towing multiple trailers having a steering mechanism (see D. M. Tilbury, O. J. Sordalen, L. G. Bushnell, and S. S. Sastry, "A Multisteering Trailer System: Conversion into Chained Form using Dynamic Feedback", IEEE Transactions on Robotics and Automation, vol. 11, no. 6, 807/818, (1995), D. M. Tilbury and S. S. Sastry: The Multi-Steering N-Trailer System: A Case Study of Goursat Normal Forms and Prolongations", International Journal of Robust and Non-linear Control, vol. 5, no. 4, 343/364, (1995), and Yoshihiko Nakamura, Hideaki Ezaki and Woojin Chung, "Design of Steering Mechanism and Control of Nonholonomic Trailer Systems", Journal of the Robotics Society of Japan, vol. 17, no. 6, 839/847, (1999)) and two mobile robots cooperatively conveying a carrier (see Hiroaki Yamaguchi and Tamio Arai "2-dai No Sharyougata Idou Robot Kara Kouseisareru Kyouchou Hansou System No Keirotuijuu Feedback Seigyo Hou" (Path Tracking Feedback Control of a Cooperative Conveying System Composed of Two Vehicle Type Mobile Robots) (Transactions of The Society of Instrument and Control Engineers), vol. 39, no. 6, 575/584, (2003)).

While the conveying systems mentioned above are moved by driving wheels, movement of the three-branched mobile mechanism is realized by driving joints. In other words, driving of joints is converted into movement of the mobile mechanism.

In each of the above mentioned conveying systems, kinematic equations can be converted into chained form. Chained form is a kind of canonical form, and effective control methods have been proposed based on this canonical form.

Here, kinematic equations of the three-branched mobile mechanism will be converted into chained form, and a control system, in particular a feedback control system for the three-branched mobile mechanism will be investigated based on this canonical form.

However, it is not easy to convert the kinematic equations of the three-branched mobile mechanism 10 according to this embodiment into chained form, since it has an off-hook type structure in which the steering mechanisms 1S, 3AS, 3BS and 3CS are spaced apart from the joints 2A, 2B and 2C that connect the links 3A, 3B and 3C to the corresponding vertexes of the equilateral triangular base 1, as shown in FIG. 1.

In view of this, in the following discussion of this embodiment, we assume that there are a virtual joint 4A, a virtual link 5A, a virtual axle 5AX of the virtual link, virtual passive wheels 5W mounted on the virtual axle 5AX and a virtual steering mechanism 5AS, whereby it will be demonstrated that the kinematic equations thereof can be converted into five-chain, single-generator chained form by showing calculation results, in spite of its off-hook type structure of the three-branched mobile mechanism 10.

In addition, a feedback control method based on the chained form that enables tracking on a straight path will be proposed.

The design of the three-branched mobile mechanism 10, conversion of its kinematic equations into chained form and effectiveness of the feedback control system enabling tracking on a straight path have been verified based on simulation.

In the following, the three-branched mobile mechanism 10 as an embodiment of the present invention will be described in detail with reference to the accompanying drawings.

[1. Structure of the Three-Branched Mobile Mechanism]

The mobile mechanism performing undulatory locomotion according to this embodiment is intended to convey an article(s). As shown in FIG. 1, the three-branched mobile mechanism 10 according to this embodiment has an equilateral triangular base 1 that can bear an article(s) to be conveyed (not shown).

Wheels (steer wheels) are attached on the equilateral triangular base 1 at the gravitational center thereof. It is possible to positively change the turning direction of the wheels relative to the orientation of the base 1 by drive force of an actuator (such as a servo motor). The wheels are passive wheels that are turned passively. As per the above, a steering mechanism 1S is provided on the equilateral triangular base 1 at the gravitational center thereof.

Here, the base 1 constitutes the member (or the base member) according to the present invention, the steering mechanism 1S constitutes the steering mechanism (or the base portion steering mechanism) according to the present invention, and the wheels whose turning direction can be changed by drive force of the actuator constitutes the passive element of the steering mechanism (or the passive wheels of the steering mechanism) according to the present invention.

Links 3A (link-1), 3B (link-2) and 3C (link-3) that constitute the members or the link members according to the present invention are connected to the equilateral triangular base 1 by means of joints 2A (joint-1), 2B (joint-2) and 2C (joint-3) at the respective vertexes of the base 1. Steering mechanisms 3AS, 3BS and 3CS that constitute the steering mechanisms or the link portion steering mechanisms according to the present invention are fixed on the respective links 3A, 3B and 3C at their midpoints.

As per the above, the center of gravity of the equilateral triangular base 1 is supported by the steering mechanism 1S, and the three vertexes of the base 1 are supported by the links 3A, 3B and 3C having the steering mechanisms 3AS, 3BS and 3CS attached thereon respectively.

Thus, the three-branched mobile mechanism 10 according to this embodiment can bear an object to be conveyed (not shown) with sufficient stability.

In the three-branched mobile mechanism 10, it is possible to move and turn the equilateral triangular base 1 by driving the three joints 2A, 2B and 2C (specifically, driving the joints 2A, 2B and 2C to cause the links 3A, 3B and 3C to swing in the direction parallel to the plane of the drawing sheet of FIG. 1 about the respective joints 2A, 2B and 2C as the pivots) and operating the four steering mechanisms 1S, 3AS, 3BS and 3CS. Here, "turning" also includes movement of the mobile mechanism along a certain curvature and turning of the mobile mechanism about its gravitational center (i.e. rotation), and "moving" also includes movement of the mobile mechanism while rotating. Here, "swinging" refers to motion about a supporting point (or a pivot) (i.e. pivoting) in any direction. In other words, "to swing" includes the case where a link member swings about a supporting point by a predetermined angle and stops, and then swings in the opposite direction, and the case where a link member oscillates at a predetermine cycle, as well as the case where a link member simply swings about a supporting point. The plane substantially perpendicular to the pivot axis in the swinging of the link members about the pivot axis will be referred to as the plane of swinging hereinafter.

Each of the joints 2A, 2B and 2C is provided with an actuator (e.g. a servo motor). The actuators can cause the links 3A, 3B and 3C to swing relative to the equilateral triangular base 1 independently from each other in the direction parallel to the plane of the drawing sheet of FIG. 1 about the respective joints 2A, 2B and 2C as the pivots.

The steering mechanism 1S on the base 1 is adapted to achieve steering by changing the positional relationship (or the relative angle) between the base 1 and the turning direction of the steer wheels by an actuator (e.g. a servo motor) provided between the base 1 and the steer wheels attached to the base 1. The other steering mechanisms 3AS, 3BS and 3CS are adapted to achieve steering by changing the positional relationship between the respective links 3A, 3B ad 3C and the turning directions of the corresponding steer wheels attached thereto by actuators (e.g. servo motors) provided between the respective links 3A, 3B and 3C and the corresponding steer wheels attached thereto.

Here, the actuators that drive the respective joints 2A, 2B and 2C constitute the link actuators according to the present invention, the actuators for operating the steering mechanisms 3AS, 3BS and 3CS provided on the links 3A, 3B and 3C constitute the link steering actuators according to the present invention. The actuator for steering the steering mechanism 1S provided on the base 1 constitutes the base portion steering actuator according to the present invention.

In connection with the above, the actuators that serve as drive sources for driving the three joints 2A, 2B and 2C and for steering the four steering mechanisms 1S, 3AS, 3BS and 3CS may be stepping motors or the like instead of servo motors, and encoders for detecting the angular velocity and angular acceleration of rotation of the joints 2A, 2C and 2C and encoders for detecting the angular velocity and angular acceleration of steering movement of the steering mechanisms 1S, 3AS, 3BS and 3CS may be provided. If the available torque of the motor is insufficient, reduction gears may be additionally used. Each steering mechanism may be driven by rotational driving force of a motor or the like without converting the rotational output of the motor into other type of motion (such as translational motion or reciprocating motion). The driving force of the actuator (which includes not only a motor or the like but also an actuator that provides a driving force by reciprocating movement) may be transmitted to the joints 2A, 2B, 2C and the steering mechanisms 1S, 3AS, 3BS and 3CS via by means of link mechanisms or the like.

Driving of the above described three joints 2A, 2B and 2C and steering of the four steering mechanisms 1S, 3AS, 3BS and 3CS may be controlled by control means having a CPU, a ROM, a RAM, an A/D and D/A converters and various interfaces. If it is desired to reduce the size and weight of the control means, it may be constructed in the form of a microcomputer or a microchip. In the case where a feedback control is performed, various sensors such as an image sensor (e.g. a CCD camera or a CMOS camera) may be used to detect the position and the posture of the mobile mechanism, and the angular velocity of pivoting of the joints 2A, 2B and 2C and angular velocity on steering of the steering mechanisms 1S, 3AS, 3BS and 3CS may be controlled based on detection results so as to achieve desired motion (such as positional shift and rotation). The aforementioned control means may be supported on the base 1, or alternatively it may be constructed as a unit separate from the base 1 or the mobile mechanism, and detection signals of the sensors and control signals may be transmitted and received through wire or wireless communication.

[2. Kinematic Equation]

In the following, a feedback control for causing the equilateral triangular base 1 to follow a straight path will be discussed.

In this three-branched mobile mechanism 10, it is possible to positively and effectively eliminate singular postures, or postures in which it is not possible to uniquely determine its motion by driving the joints 2A, 2B and 2C while practicing the steering function of the wheels 3AS, 3BS, 3CS and 1S attached on the links 3A, 3B and 3C and on the base 1.

It is also possible to apply this control method to a conventional snake-type robot by giving a steering function to wheels attached to links. This control method can also be applied to a snake-like robot having a closed loop. In other words, mechanisms to which control method described in the following can be applied are not limited to the three-branched mobile mechanism 10 according to this embodiment.

In this chapter, the kinematic equations of the three-branched mobile mechanism 10 shown in FIG. 1 will be first discussed, and the kinetic equations of the three-branched mobile mechanism 10 having virtual mechanical elements will be secondly discussed.

[2.1 Kinematic Equations of Three-Branched Mobile Mechanism]

The position $(x_1, y_1)^T$, $(x_2, y_2)^T$, $(x_3, y_3)^T$ of the midpoints of the first, second and third links 3A, 3B and 3C of the three-branched mobile mechanism 10 shown in FIG. 1 are represented as the following set of equations (1).

$$\begin{cases} x_1 = x_b + l\cos\theta_b + l\cos\theta_1 \\ x_2 = x_b - l\cos\left(\theta_b - \frac{1}{3}\pi\right) - l\cos\theta_2 \\ x_3 = x_b - l\cos\left(\theta_b + \frac{1}{3}\pi\right) - l\cos\theta_3 \\ y_1 = y_b + l\sin\theta + l\sin\theta_1 \\ y_2 = y_b - l\sin\left(\theta_b - \frac{1}{3}\pi\right) - l\sin\theta_2 \\ y_3 = y_b - l\sin\left(\theta_b + \frac{1}{3}\pi\right) - l\sin\theta_3. \end{cases} \quad (1)$$

Figure 3:
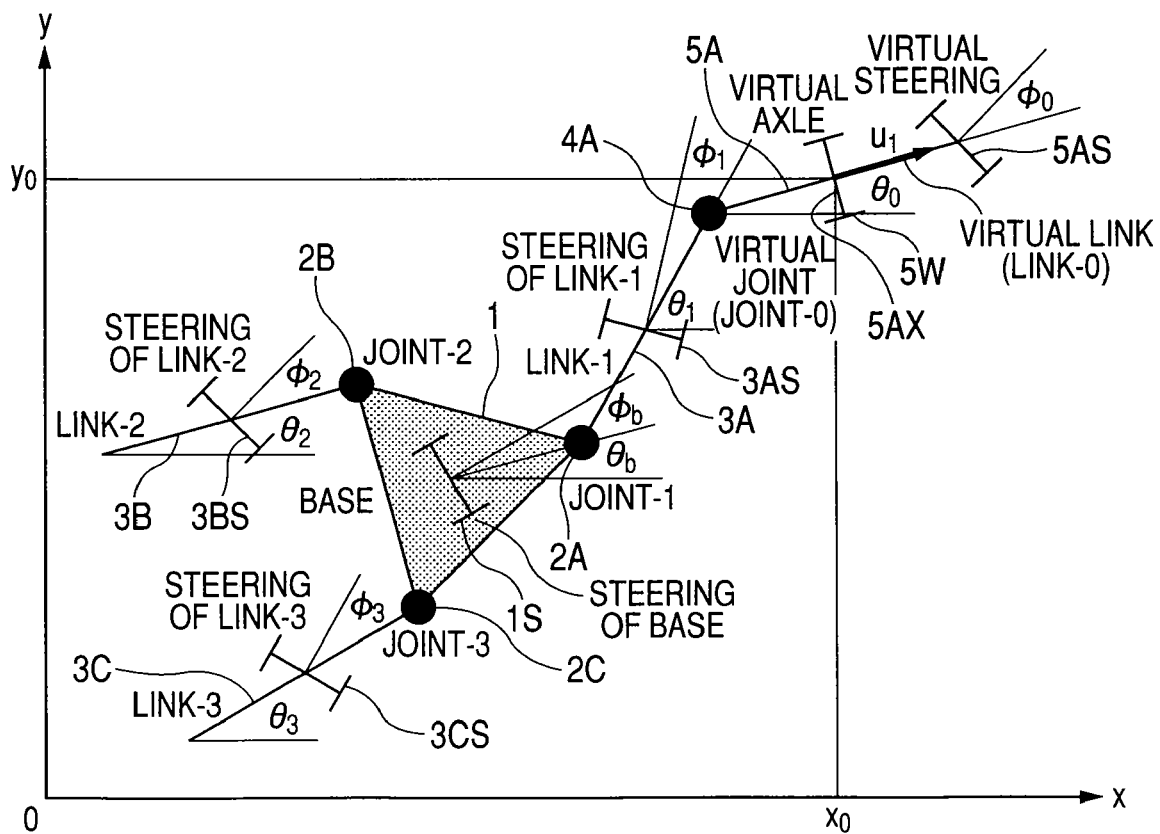
FIG. 3 is a diagram showing the structure of the three-branched mobile mechanism according to the embodiment in which a virtual joint, a virtual link, a virtual link axle, virtual wheels mounted on the virtual link axle and a virtual steering mechanism imaginarily introduced to convert the kinematic equations of the three-branches mobile mechanism into five-chain, single-generator chained form.

Vector $(x_b, y_b)^T$ represents the center of gravity of the equilateral triangular base 1. Angles $\theta_1$, $\theta_2$, $\theta_3$ and $\theta_b$ represent the posture of the first, second and third links 3A, 3B and 3C and the equilateral triangular base 1 respectively. (How these angles $\theta_1$, $\theta_2$, $\theta_3$ and $\theta_b$ are measured is shown in FIG. 3).

The constraints on the velocity of the steering mechanisms 3AS, 3BS and 3CS attached to the first, second and third links 3A, 3B and 3C and the constraint on the velocity of the steering mechanism 1S attached on the equilateral triangular base 1 at its center of gravity are given by the following set of equations (2).

$$\begin{cases} \dot{x}_1\sin(\theta_1 + \phi_1) - \dot{y}_1\cos(\theta_1 + \phi_1) = 0 \\ \dot{x}_2\sin(\theta_2 + \phi_2) - \dot{y}_2\cos(\theta_2 + \phi_2) = 0 \\ \dot{x}_3\sin(\theta_3 + \phi_3) - \dot{y}_3\cos(\theta_3 + \phi_3) = 0 \\ \dot{x}_b\sin(\theta_b + \phi_b) - \dot{y}_b\cos(\theta_b + \phi_b) = 0. \end{cases} \quad (2)$$

Angles $\phi_1$, $\phi_2$, $\phi_3$ and $\phi_b$ respectively represent the steering angles of the steering mechanisms 3AS, 3BS and 3CS of the first, second and third links 3A, 3B and 3C and the steering angle of the steering mechanism 1S of the equilateral triangular base 1. (How these angles $\phi_1$, $\phi_2$, $\phi_3$ and $\phi_b$ are measured is shown in FIG. 3.) Substituting the displacement velocities $(\dot{x}_1, \dot{y}_1)^T$, $(\dot{x}_2, \dot{y}_2)^T$ and $(\dot{x}_3, \dot{y}_3)^T$ of the midpoints of the first, second and third links 3A, 3B and 3C, which are obtained by taking the derivative with respect to time of equations (1), into equations (2) yields the following kinematic equations (3) and (4) of the three-branched mobile mechanism 10 shown in FIG. 1.

$$[A]\|\cos(\theta_b + \phi_b)\| \geq \frac{1}{\sqrt{2}}: \quad (3)$$

$$\hat{A}\begin{pmatrix} \dot{x}_b \\ \dot{\theta}_b \end{pmatrix} = \hat{B}\begin{pmatrix} \dot{\psi}_1 \\ \dot{\psi}_2 \\ \dot{\psi}_3 \end{pmatrix},$$

$$\dot{y}_b = \tan(\theta_b + \phi_b)\dot{x}_b,$$

$$\hat{A} = \begin{pmatrix} \hat{a}_{11} & \hat{a}_{12} \\ \hat{a}_{21} & \hat{a}_{22} \\ \hat{a}_{31} & \hat{a}_{32} \end{pmatrix},$$

$$\hat{B} = diag(\hat{b}_{11} \quad \hat{b}_{22} \quad \hat{b}_{33}),$$

$$\hat{a}_{11} = \sin(\theta_1 + \phi_1) - \cos(\theta_1 + \phi_1)\tan(\theta_b + \phi_b),$$

$$\hat{a}_{12} = -l\cos(\theta_1 + \phi_1 - \theta_b) - l\cos\phi_1,$$

$$\hat{a}_{21} = \sin(\theta_2 + \phi_2) - \cos(\theta_2 + \phi_2)\tan(\theta_b + \phi_b),$$

$$\hat{a}_{22} = l\cos\left(\theta_2 + \phi_2 - \theta_b + \frac{1}{3}\pi\right) + l\cos\phi_2,$$

$$\hat{a}_{31} = \sin(\theta_3 + \phi_3) - \cos(\theta_3 + \phi_3)\tan(\theta_b + \phi_b),$$

$$\hat{a}_{32} = l\cos\left(\theta_3 + \phi_3 - \theta_b - \frac{1}{3}\pi\right) + l\cos\phi_3,$$

$$\hat{b}_{11} = l\cos\phi_1,$$

$$\hat{b}_{22} = -l\cos\phi_2,$$

$$\hat{b}_{33} = -l\cos\phi_3.$$

-continued $$[B]\|\sin(\theta_b + \phi_b)\| > \frac{1}{\sqrt{2}}:\quad(4)$$

$$\check{A}\begin{pmatrix}\dot{y}_b\\\dot{\theta}_b\end{pmatrix} = \check{B}\begin{pmatrix}\dot{\psi}_1\\\dot{\psi}_2\\\dot{\psi}_3\end{pmatrix},$$

$$\dot{x}_b = \tan(\theta_b + \phi_b)^{-1}\dot{y}_b,$$

$$\check{A} = \begin{pmatrix}\check{a}_{11} & \check{a}_{12}\\\check{a}_{21} & \check{a}_{22}\\\check{a}_{31} & \check{a}_{32}\end{pmatrix},$$

$$\check{B} = diag(\check{b}_{11}, \check{b}_{22}, \check{b}_{33}),$$

$$\check{a}_{11} = \sin(\theta_1 + \phi_1)\tan(\theta_b + \phi_b)^{-1} - \cos(\theta_1 + \phi_1),$$

$$\check{a}_{12} = -l\cos(\theta_1 + \phi_1 - \theta_b) - l\cos\phi_1,$$

$$\check{a}_{21} = \sin(\theta_2 + \phi_2)\tan(\theta_b + \phi_b)^{-1} - \cos(\theta_2 + \phi_2),$$

$$\check{a}_{22} = l\cos\left(\theta_2 + \phi_2 - \theta_b + \frac{1}{3}\pi\right) + l\cos\phi_2,$$

$$\check{a}_{31} = \sin(\theta_3 + \phi_3)\tan(\theta_b + \phi_b)^{-1} - \cos(\theta_3 + \phi_3),$$

$$\check{a}_{32} = l\cos\left(\theta_3 + \phi_3 - \theta_b + \frac{1}{3}\pi\right) + l\cos\phi_3,$$

$$\check{b}_{11} = l\cos\phi_1,$$

$$\check{b}_{22} = -l\cos\phi_2$$

$$\check{b}_{33} = -l\cos\phi_3.$$

$$\begin{cases}\dot{\psi}_1 = \dot{\theta}_1 - \dot{\theta}_b,\\\dot{\psi}_2 = \dot{\theta}_2 - \dot{\theta}_b,\\\dot{\psi}_3 = \dot{\theta}_3 - \dot{\theta}_b.\end{cases}\quad(5)$$

Angular velocities $\dot{\psi}_1$, $\dot{\psi}_2$ and $\dot{\psi}_3$ are angular velocities of driving of the first, second and third joints 2A, 2B and 2C respectively. It will be understood from these equations (3) and (4) that there is the following singular posture 1 in the three-branched mobile mechanism 10 shown in FIG. 1.

<Singular Posture 1>

In postures in which rank $\hat{A}<2$ or rank $\check{A}<2$ are satisfied in equations (3) and (4), the displacement velocity $(\dot{x}_b, \dot{y}_b)^T$ and the rotation velocity $\dot{\theta}_b$ of the equilateral triangular base 1 cannot be uniquely determined from the angular velocities $\dot{\psi}_1$, $\dot{\psi}_2$ and $\dot{\psi}_3$ of driving of the first, second and third joints 2A, 2B and 2C. This means that such postures are singular postures that cannot be controlled.

Figure 2:
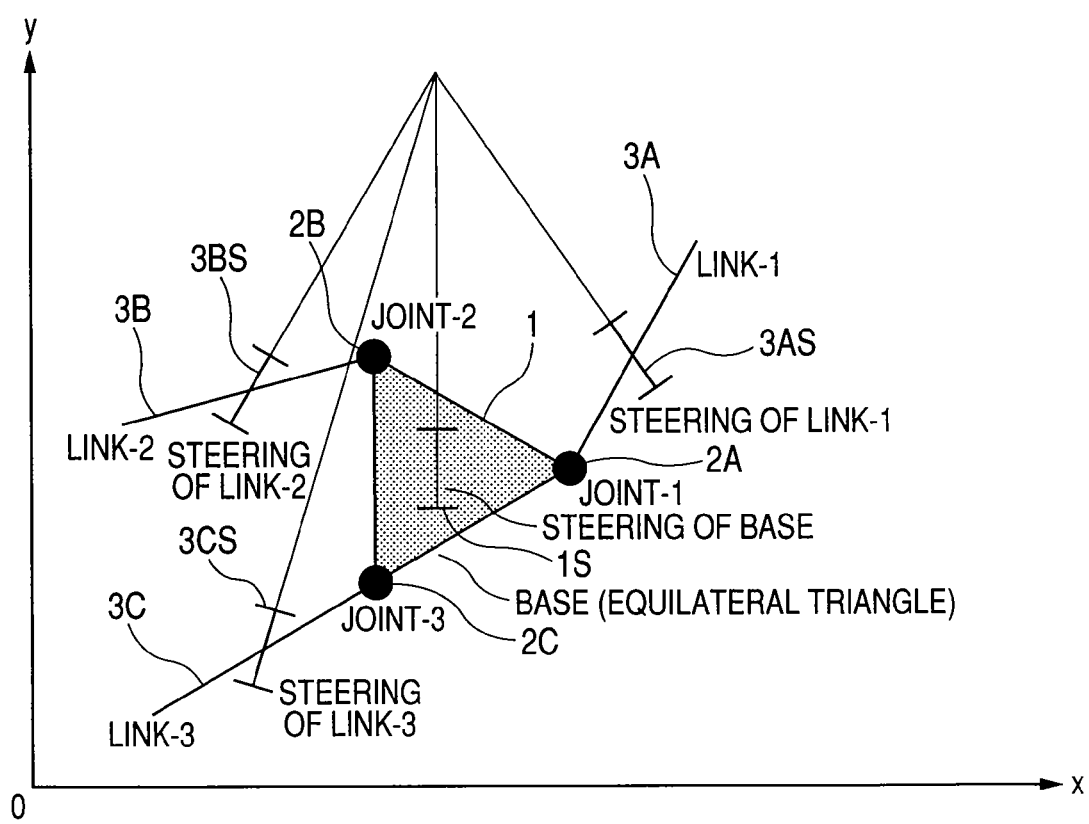
FIG. 2 is a diagram illustrating a singular posture of the three-branched mobile mechanism according to the embodiment.

There is a characteristic posture among the singular posture 1, as shown in FIG. 2 in which all the steering mechanisms 1S, 3AS, 3BS and 3CS of the three branched mobile mechanism 10 have the same rotation center in the two-dimensional plane of FIG. 2.

Needless to say, in the posture in which rank $\hat{A}=2$ or rank $\check{A}=2$ is satisfied, two of the angular velocities $\dot{\psi}_1$, $\dot{\psi}_2$ and $\dot{\psi}_3$ of driving of the first, second and third joints 2A, 2B and 2C are independent, and the other one angular velocity is dependent on the two independent angular velocities.

It is necessary to drive the first, second and third joints 2A, 2B and 2C and to operate the steering mechanisms 3AS, 3BS and 3CS provided on the first, second and third links 3A, 3B and 3C and the steering mechanism 1S provided at the center of gravitation of the equilateral triangular base 1 in such a way that the three-branched mobile mechanism 10 can move while being prevented from assuming the above-mentioned singular postures 1.

[2.2 Kinematic Equations of the Three-Branched Mobile Mechanism Having Virtual Mechanical Elements]

It is not easy to derive a feedback control method for causing the equilateral triangular base 1 to follow a straight path from the kinematic equations (3) and (4). As shown in FIG. 3, we assume that there is a virtual link 5A that is connected to the tip end of the first link 3A via a virtual joint 4A. We also assume that on the virtual link 5A is attached a virtual axle 5AX at the midpoint thereof and that virtual wheels 5W are mounted on the virtual axle 5AX, and a virtual steering mechanism 5AS is attached at the tip end of the virtual link 5A.

These virtual mechanical elements have been imaginarily introduced to convert the kinematic equations of the three-branched mobile mechanism 10 into five-chain, single-generator chained form, and they do not exist actually. Therefore, these elements do not impose any physical constraints on motion of the three-branched mobile mechanism 10.

In the method proposed here, the angular velocities of driving the first, second and third joints 2A, 2B and 2C and the angular velocities of steering of the steering mechanisms 3AS, 3BS and 3CS attached on the first, second and third links 3A, 3B and 3C and the steering mechanism 1S attached at the center of gravity of the equilateral triangular base 1 are determined in accordance with the angle of the virtual joint 4A and the steering angle of the virtual steering mechanism 5AS attached on the virtual link 5A so that the three-branched mobile mechanism moves while satisfying the above-mentioned constraints.

Let $u_1$ be the speed of displacement of the virtual link 5A, then kinematic equations of the three-branched mobile mechanism 10 shown in FIG. 3 are as follows:

$$\dot{x} = g_1(x)u_1 + g_2(x)u_2 + g_3(x)u_3 + g_4(x)u_4 + g_5(x)u_5 + g_6(x)u_6,\quad(6)$$

$$x = (x_0, y_0, \phi_0, \theta_0, \phi_1, \theta_1, \phi_b, \theta_b, \phi_2, \theta_2, \phi_3, \theta_3)^T,$$

$$g_1 = (g_{11}, g_{12}, g_{13}, g_{14}, g_{15}, g_{16}, g_{17}, g_{18}, g_{19}, g_{110}, g_{111}, g_{112})^T,$$
$$g_2 = (0, 0, 1, 0, 0, 0, 0, 0, 0, 0, 0, 0)^T,$$
$$g_3 = (0, 0, 0, 0, 1, 0, 0, 0, 0, 0, 0, 0)^T,$$
$$g_4 = (0, 0, 0, 0, 0, 0, 1, 0, 0, 0, 0, 0)^T,$$
$$g_5 = (0, 0, 0, 0, 0, 0, 0, 0, 1, 0, 0, 0)^T,$$
$$g_6 = (0, 0, 0, 0, 0, 0, 0, 0, 0, 0, 1, 0)^T,$$

$$\begin{cases}g_{11} = \cos\theta_0\\g_{12} = \sin\theta_0\\g_{13} = 0\\g_{14} = \dfrac{\alpha_{0n}}{l}\\g_{15} = 0\\g_{16} = \dfrac{\alpha_{1n}}{l\cos\phi_1}\\g_{17} = 0\\g_{18} = \dfrac{\alpha_{b1n}}{l\cos\phi}\\g_{19} = 0\\g_{110} = \dfrac{\alpha_{2n}}{l\cos\phi_2}\\g_{111} = 0\\g_{112} = \dfrac{\alpha_{3n}}{l\cos\phi_3},\end{cases}$$

$$\begin{cases}\alpha_{0t} = 1\\\alpha_{0n} = \tan\phi_0,\end{cases}\quad(7)$$

-continued $$\begin{cases} \alpha_{1t} = \alpha_{0t}\cos(\theta_0 - \theta_1 - \phi_1) + \alpha_{0n}\sin(\theta_0 - \theta_1 - \phi_1) - \\ \quad 2l\sin\phi_1 \frac{\alpha_{1n}}{l\cos\phi_1} \\ \alpha_{1n} = \alpha_{0t}\sin(\theta_0 - \theta_1 - \phi_1) - \alpha_{0n}\cos(\theta_0 - \theta_1 - \phi_1), \end{cases} \quad (8)$$

$$\begin{cases} \alpha_{b1t} = \alpha_{1t}\cos(\theta_1 + \phi_1 - \theta_b - \phi_b) + \\ \quad \alpha_{1n}\sin(\theta_1 + \phi_1 - \theta_b - \phi_b) \\ \alpha_{b1n} = \alpha_{1t}\sin(\theta_1 + \phi_1 - \theta_b - \phi_b) - \\ \quad \alpha_{1n}\cos(\theta_1 + \phi_1 - \theta_b - \phi_b), \end{cases} \quad (9)$$

$$\begin{cases} \alpha_{b2t} = \alpha_{b1t} - l\sin\phi_b \frac{\alpha_{b1n}}{l\cos\phi_b} - l\cos(\phi_b - \pi/6)\frac{\alpha_{b1n}}{l\cos\phi_b} \\ \alpha_{b2n} = -l\sin(\phi_b - \pi/6)\frac{\alpha_{b1n}}{l\cos\phi_b}, \end{cases} \quad (10)$$

$$\begin{cases} \alpha_{b3t} = \alpha_{b1t} - l\sin\phi_b \frac{\alpha_{b1n}}{l\cos\phi_b} - l\cos(\phi_b - 5\pi/6)\frac{\alpha_{b1n}}{l\cos\phi_b} \\ \alpha_{b3n} = -l\sin(\phi_b - 5\pi/6)\frac{\alpha_{b1n}}{l\cos\phi_b}, \end{cases} \quad (11)$$

$$\begin{cases} \alpha_{2t} = \alpha_{b2t}\cos(\theta_b + \phi_b - \theta_2 - \phi_2) + \\ \quad \alpha_{b2n}\sin(\theta_b + \phi_b - \theta_2 - \phi_2) - 2l\sin\phi_2 \frac{\alpha_{2n}}{l\cos\phi_2} \\ \alpha_{2n} = \alpha_{b2t}\sin(\theta_b + \phi_b - \theta_2 - \phi_2) - \\ \quad \alpha_{b2n}\cos(\theta_b + \phi_b - \theta_2 - \phi_2), \end{cases} \quad (12)$$

$$\begin{cases} \alpha_{3t} = \alpha_{b3t}\cos(\theta_b + \phi_b - \theta_3 - \phi_3) + \\ \quad \alpha_{b3n}\sin(\theta_b + \phi_b - \theta_3 - \phi_3) - 2l\sin\phi_3 \frac{\alpha_{3n}}{l\cos\phi_3} \\ \alpha_{3n} = \alpha_{b3t}\sin(\theta_b + \phi_b - \theta_3 - \phi_3) - \\ \quad \alpha_{b3n}\cos(\theta_b + \phi_b - \theta_3 - \phi_3). \end{cases} \quad (13)$$

Vector $(x_0, y_0)^T$ represents the position of the midpoint of the virtual link 5A. Angle $\phi_0$ and angle $\theta_0$ respectively represent the steering angle and posture (or orientation) of the virtual steering mechanism 5AS of the virtual link 5A.

Five control inputs $u_2$, $u_3$, $u_4$, $u_5$ and $u_6$ respectively represent the angular velocity of steering of the virtual steering mechanism 5AS on the virtual link 5A, the angular velocity of steering of the steering mechanism 3AS on the first link 3A, the angular velocity of steering of the steering mechanism 1S on the equilateral triangular base 1, the angular velocity of steering of the steering mechanism 3BS on the second link 3B and the angular velocity of steering of the steering mechanism 3CS on the third link 3C.

The displacement speed $u_1$ of the virtual link 5A is not a control input, needless to say. Given angular velocity inputs $v_1$, $v_2$ and $v_3$ for the angular velocities $\dot{\psi}_1$, $\dot{\psi}_2$ and $\dot{\psi}_3$ of driving of the first, second and third joints 2A, 2B and 2C, the displacement speed $u_1$ is determined in such a way that the following equations (14) are satisfied:

$$\begin{cases} \dot{\psi}_1 = \dot{\theta}_1 - \dot{\theta}_b = (g_{16} - g_{18})u_1 = v_1 \\ \dot{\psi}_2 = \dot{\theta}_2 - \dot{\theta}_b = (g_{110} - g_{18})u_1 = v_2 \\ \dot{\psi}_3 = \dot{\theta}_3 - \dot{\theta}_b = (g_{112} - g_{18})u_1 = v_3. \end{cases} \quad (14)$$

Table 1: Eight Combinations of Coefficients in Equations (14)

| case-1 | $g_{16} - g_{18} \neq 0$ | $g_{110} - g_{18} \neq 0$ | $g_{112} - g_{18} \neq 0$ |
| case-2 | $g_{16} - g_{18} \neq 0$ | $g_{110} - g_{18} \neq 0$ | $g_{112} - g_{18} = 0$ |
| case-3 | $g_{16} - g_{18} \neq 0$ | $g_{110} - g_{18} = 0$ | $g_{112} - g_{18} \neq 0$ |
| case-4 | $g_{16} - g_{18} = 0$ | $g_{110} - g_{18} \neq 0$ | $g_{112} - g_{18} \neq 0$ |
| case-5 | $g_{16} - g_{18} \neq 0$ | $g_{110} - g_{18} = 0$ | $g_{112} - g_{18} = 0$ |
| case-6 | $g_{16} - g_{18} = 0$ | $g_{110} - g_{18} \neq 0$ | $g_{112} - g_{18} = 0$ |
| case-7 | $g_{16} - g_{18} = 0$ | $g_{110} - g_{18} = 0$ | $g_{112} - g_{18} \neq 0$ |
| case-8 | $g_{16} - g_{18} = 0$ | $g_{110} - g_{18} = 0$ | $g_{112} - g_{18} = 0$ |

There are eight cases in Equations (14) as shown in Table 1 presented above. In these case, equations (14) can be interpreted as follows.

In case 1, if an angular velocity input $v_1$ of the first joint 2A is given, the speed of displacement $u_1$ of the virtual link 5A is uniquely determined. Similarly, if an angular velocity input $v_2$ of the second joint 2B is given, the displacement speed $u_1$ is uniquely determined. Alternatively, if an angular velocity input $v_3$ of the third joint 2C is given, the displacement speed $u_1$ is uniquely determined.

In case 1, inputs $v_1$, $v_2$ and $v_3$ are not independent from each other. If one of them is given, the other two are uniquely determined in such a way as to satisfy equations (14).

Also in any of cases 2 to 7, similarly, the speed of displacement $u_1$ of the virtual link 5A is determined uniquely.

As per the above, in cases 1 to 7, it is possible to control the speed of displacement $u_1$ of the virtual link 5A by controlling the angular velocity inputs $v_1$, $v_2$ and $v_3$ for driving the first, second and third joints 2A, 2B and 2C.

In contrast, in case 8, it is not possible to uniquely determine the displacement speed $u_1$ based on the angular velocity inputs $v_1$, $v_2$ and $v_3$, in other words, it is not possible to control the speed $u_1$.

Thus, it is understood from equations (14) that there is the following singular posture 2 in the three-branched mobile mechanism 10 shown in FIG. 3.

<Singular Posture 2>

In postures in which $g_{16} - g_{18} = 0$, $g_{110} - g_{18} = 0$ and $g_{112} - g_{18} = 0$ are satisfied in equations (14), the speed of displacement $u_1$ of the virtual link 5A cannot be uniquely determined from the angular velocity inputs $v_1$, $v_2$ and $v_3$ for driving the first, second and third joints 2A, 2B and 2C. This means that such postures are singular postures that cannot be controlled.

This singular posture 2 is equivalent to singular posture 1. The control method we propose is adapted to drive the virtual joint 4A and the first, second and third joints 2A, 2B and 2C and to operate the virtual steering mechanism 5AS provided on the virtual link 5A, the steering mechanisms 3AS, 3BS and 3CS provided on the first, second and third links 3A, 3B and 3C and the steering mechanism 1S provided at the center of gravitation of the equilateral triangular base 1 in such a way that the three-branched mobile mechanism 10 can move while being prevented from assuming the above-mentioned singular postures 1 and 2.

In this case, the angular velocity $\dot{\psi}_0$ for driving the virtual joint 4A or the angular velocity input $v_0$ is calculated as follows.

$$\dot{\psi}_0 = \dot{\theta}_0 - \dot{\theta}_1 = (g_{14} - g_{16})u_1 = v_0. \quad (15)$$

It is not possible to determine the displacement speed $u_1$ of the virtual link 5A or to control the motion based on the angular velocity input $v_0$ for driving the virtual joint 4A as a matter of course.

Therefore, in this control method, the angular velocity $\dot{\psi}_0$ for driving the virtual joint 4A or the angular velocity input $v_0$ is uniquely determined from $u_1$, which is determined in such a way as to satisfy equation (14), based on equation (15).

[Conversion into Chained Form]

Here, it is assumed that there is a virtual link 5A that is connected to the tip end of the first link 3A in the three-branched mobile mechanism 10 by means of a virtual joint 4A. On this virtual link 5A is attached a virtual axle 5AX at its midpoint, and on the virtual axle 5AX are mounted virtual passive wheels 5W. In addition, a virtual steering mechanism 5AS is attached at the tip end of the virtual link 5A. In the following, we demonstrate that by assuming the presence of these virtual mechanical elements, the kinematic equations of the three-branched mobile mechanism 10 can be converted into five-chain, single-generator chained form by showing calculation.

This conversion is made based on differential geometry (see A. Isidori: Nonlinear Control Systems, New York: Springer-Verlag, Second Edition, (1989)).

First, six vector fields $g_1$, $g_2$, $g_3$, $g_4$, $g_5$ and $g_6$ in equations (6) are converted as follows.

$$\begin{cases} f_1 = g_1/\cos\theta_0 \\ f_i = g_i, \quad i = 2, 3, \ldots, 6. \end{cases} \quad (16)$$

Secondly, $u_1$, $u_2$, $u_3$, $u_4$, $u_5$ and $u_6$ are converted as follows.

$$\begin{cases} \tilde{u}_1 = u_1 \cos\theta_0 \\ \tilde{u}_i = u_i, \quad i = 2, 3, \ldots, 6. \end{cases} \quad (17)$$

Thus, kinematic equations (6) are transformed as follows.

$$\dot{x} = f_1(x)\tilde{u}_1 + f_2(x)\tilde{u}_2 + f_3(x)\tilde{u}_3 + f_4(x)\tilde{u}_4 + f_5(x)\tilde{u}_5 + f_6(x)\tilde{u}_6. \quad (18)$$

Using these six vector fields $f_1$, $f_2$, $f_3$, $f_4$, $f_5$ and $f_6$, variables in kinematic equations (6) are converted as following equations (19).

$$\begin{cases} z_{11} = h_1 = x_0 \\ z_{21} = L_{f_1}^2 h_2 = \frac{1}{\cos^3\theta_0}\frac{\tan\phi_0}{l} \\ z_{22} = L_{f_1} h_2 = \tan\theta_0 \\ z_{23} = h_2 = y_0 \\ z_{31} = L_{f_1} h_3 = \frac{1}{\cos\theta_0} g_{14} - \frac{1}{\cos\theta_0} g_{16} \\ z_{32} = h_3 = \theta_0 - \theta_1 \\ z_{41} = L_{f_1} h_4 = \frac{1}{\cos\theta_0} g_{16} - \frac{1}{\cos\theta_0} g_{18} \\ z_{42} = h_4 = \theta_1 - \theta_b \\ z_{51} = L_{f_1} h_5 = \frac{1}{\cos\theta_0} g_{110} - \frac{1}{\cos\theta_0} g_{18} \\ z_{52} = h_5 = \theta_2 - \theta_b \\ z_{61} = L_{f_1} h_6 = \frac{1}{\cos\theta_0} g_{112} - \frac{1}{\cos\theta_0} g_{18} \\ z_{62} = h_6 = \theta_3 - \theta_b. \end{cases} \quad (19)$$

Here, $L_p q$ represents the inner product of the vector whose elements are partial derivatives with respect to state variables $x_i$ ($i=1, 2, \ldots n$) of scalar quantity $q$, namely vector $(\partial q/\partial x_1, \partial q/\partial x_2, \ldots, \partial q/\partial x_n)^T$, and vector $p=(p_1, p_2, \ldots, p_n)^T$. That is:

$$L_p q = \frac{\partial q}{\partial x_1} p_1 + \frac{\partial q}{\partial x_2} p_2 + \ldots + \frac{\partial q}{\partial x_n} p_n$$

Variables $h_3$, $h_4$, $h_5$ and $h_6$ in equations (19) are the angles of the virtual joint 4A, the first, second and third joints 2A, 2B and 2C respectively. They are selected to specify driving of each joint in undulatory locomotion directly by changes in the variables.

On the other hand, in controlling a mobile robot towing multiple trailers having a steering mechanism (see D. M. Tilbury, O. J. Sordalen, L. G. Bushnell, and S. S. Sastry, "A Multisteering Trailer System: Conversion into Chained Form using Dynamic Feedback", IEEE Transactions on Robotics and Automation, vol. 11, no. 6, 807/818, (1995), D. M. Tilbury and S. S. Sastry: The Multi-Steering N-Trailer System: A Case Study of Goursat Normal Forms and Prolongations", International Journal of Robust and Nonlinear Control, vol. 5, no. 4, 343/364, (1995), and Yoshihiko Nakamura, Hideaki Ezaki and Woojin Chung, "Design of Steering Mechanism and Control of Nonholonomic Trailer Systems", Journal of the Robotics Society of Japan, vol. 17, no. 6, 839/847, (1999)), these variables represent the posture of the respective links in a coordinate system in rest. As per the above, in this control method, driving of each joint in undulatory locomotion is reflected in selection of variables required in conversion into chained form. The derivatives with respect to time of equations (19) are in five-chain, single-generator chained form shown as equations (20) presented below.

$$\begin{aligned} & \dot{z}_{11} = \omega_1 \quad \dot{z}_{21} = \omega_2 \quad \dot{z}_{31} = \omega_3 \quad \dot{z}_{41} = \omega_4 \quad (20) \\ & \dot{z}_{22} = z_{21}\omega_1 \quad \dot{z}_{32} = z_{31}\omega_1 \quad \dot{z}_{42} = z_{41}\omega_1 \\ & \dot{z}_{23} = z_{22}\omega_1 \\ & \dot{z}_{51} = \omega_5 \quad \dot{z}_{61} = \omega_6 \\ & \dot{z}_{52} = z_{51}\omega_1 \quad \dot{z}_{62} = z_{61}\omega_1, \end{aligned}$$

$$\omega_1 = \tilde{u}_1$$

$$\omega_2 = L_{f_1}^3 h_2 \tilde{u}_1 + L_{f_2} L_{f_1}^2 h_2 \tilde{u}_2 + L_{f_3} L_{f_1}^2 h_2 \tilde{u}_3 + L_{f_4} L_{f_1}^2 h_2 \tilde{u}_4 + L_{f_5} L_{f_1}^2 h_2 \tilde{u}_5 + L_{f_6} L_{f_1}^2 h_2 \tilde{u}_6$$

$$\omega_3 = L_{f_1}^2 h_3 \tilde{u}_1 + L_{f_2} L_{f_1} h_3 \tilde{u}_2 + L_{f_3} L_{f_1} h_3 \tilde{u}_3 + L_{f_4} L_{f_1} h_3 \tilde{u}_4 + L_{f_5} L_{f_1} h_3 \tilde{u}_5 + L_{f_6} L_{f_1} h_3 \tilde{u}_6$$

$$\omega_4 = L_{f_1}^2 h_4 \tilde{u}_1 + L_{f_2} L_{f_1} h_4 \tilde{u}_2 + L_{f_3} L_{f_1} h_4 \tilde{u}_3 + L_{f_4} L_{f_1} h_4 \tilde{u}_4 + L_{f_5} L_{f_1} h_4 \tilde{u}_5 + L_{f_6} L_{f_1} h_4 \tilde{u}_6$$

$$\omega_5 = L_{f_1}^2 h_5 \tilde{u}_1 + L_{f_2} L_{f_1} h_5 \tilde{u}_2 + L_{f_3} L_{f_1} h_5 \tilde{u}_3 + L_{f_4} L_{f_1} h_5 \tilde{u}_4 + L_{f_5} L_{f_1} h_5 \tilde{u}_5 + L_{f_6} L_{f_1} h_5 \tilde{u}_6$$

$$\omega_6 = L_{f_1}^2 h_6 \tilde{u}_1 + L_{f_2} L_{f_1} h_6 \tilde{u}_2 + L_{f_3} L_{f_1} h_6 \tilde{u}_3 + L_{f_4} L_{f_1} h_6 \tilde{u}_4 + L_{f_5} L_{f_1} h_6 \tilde{u}_5 + L_{f_6} L_{f_1} h_6 \tilde{u}_6.$$

This conversion is valid in the following open set U.

$$\begin{aligned} U = \{ & x: \dim(G_0) = 5, \dim(G_1) = 10, \dim(G_2) = 11; \quad (21) \\ & G_0, G_1, G_2 \text{ are involutive} \}, \\ G_0 = & \{f_2, f_3, f_4, f_5, f_6\}, \\ G_1 = & \{f_2, ad_{f_1} f_2, f_3, ad_{f_1} f_3, f_4, ad_{f_1} f_4, f_5, \\ & ad_{f_1} f_5, f_6, ad_{f_1} f_6\}, \end{aligned}$$

-continued $$G_2 = \{f_2, ad_{f_1}f_2, ad_{f_1}^2 f_2, f_3, ad_{f_1}f_3, f_4, ad_{f_1}f_4,$$
$$f_5, ad_{f_1}f_5, f_6, ad_{f_1}f_6\}$$

Here $ad_f^k g$ is:

$$ad_f^k g = [f, ad_f^{k-1} g],$$
$$ad_f^0 g = g,$$
$$[f, g] = \frac{\partial g}{\partial x} f - \frac{\partial f}{\partial x} g$$

State variables x is limited to this open set U in order to prevent singular posture 3 described in the following.

<Singular Posture 3>

Postures having a state variable x that is not contained in the open set U in equation (21) are singular postures, in converting variables, for which the kinematic equations shown in equations (6) cannot be converted into equations (20).

The singular posture 3 includes a posture in which any one of the steering angle of the virtual steering mechanism 5AS on the virtual link 5A, the steering angles of the steering mechanisms 3AS, 3BS and 3CS on the first, second and third links 3A, 3B and 3C and the steering angle of the steering mechanism 1S on the equilateral triangular base 1 is +90° or −90°

In addition, it also includes a posture in which the virtual link 5A forms an angle of ±90° with the x axis.

Figure 4:
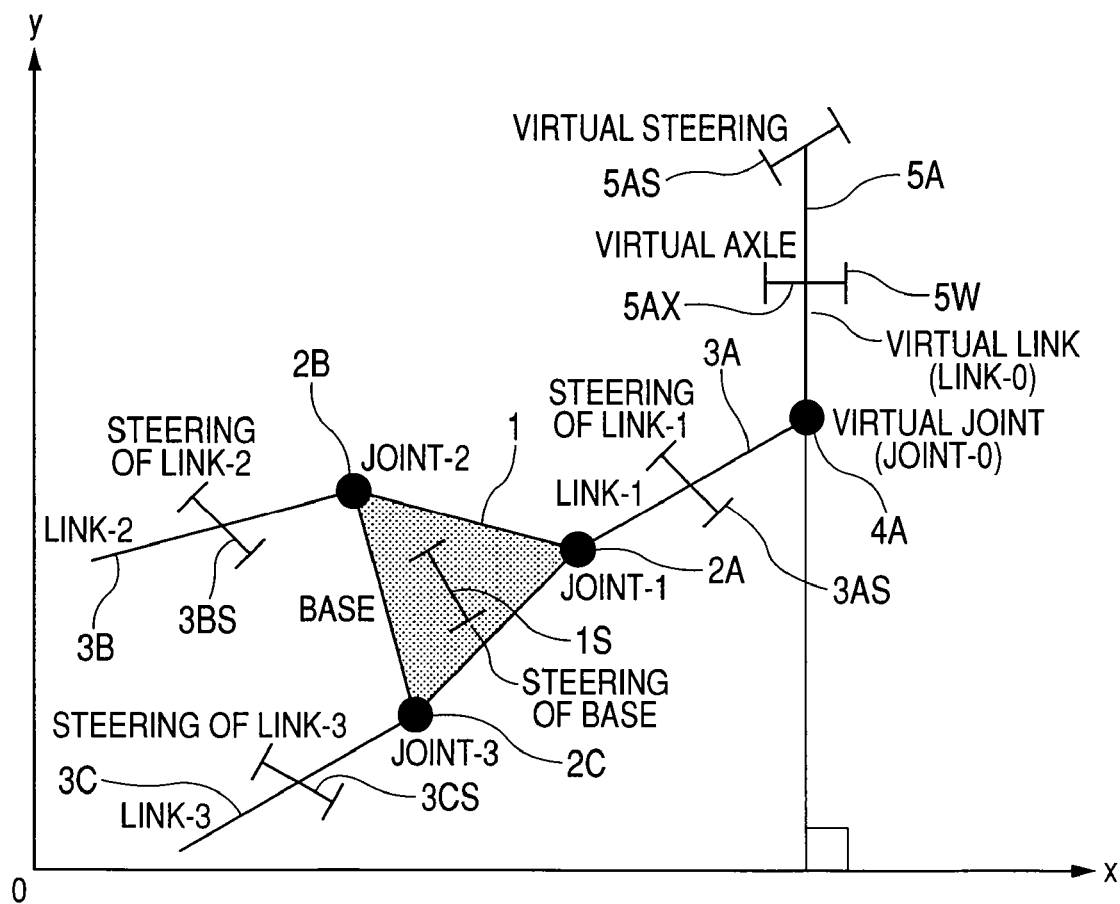
FIG. 4 is a diagram illustrating a singular posture of the three-branched mobile mechanism according to the embodiment in five-chain, single-generator chained form.
Figure 5A:
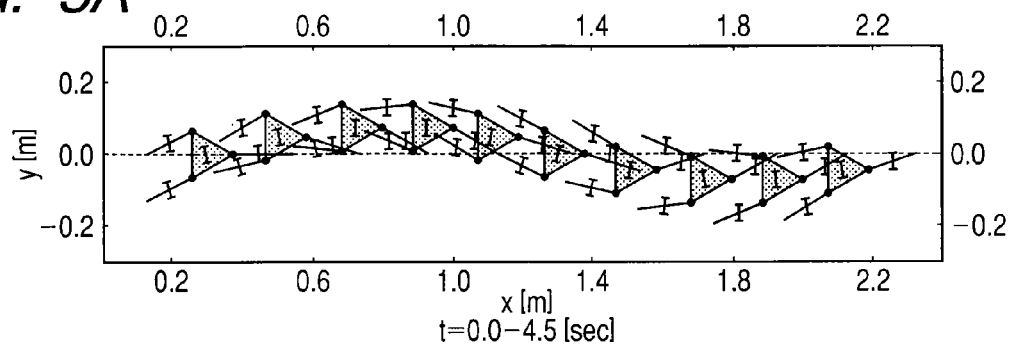
FIGS. 5A, 5B, 5C, 5D, 5E, 5F, 5G, 5H, 5I, 5J and 5K show simulation that was performed on the three-branched mobile mechanism according to the embodiment using a control method described in connection with the above-mentioned embodiment.
Figure 5B:
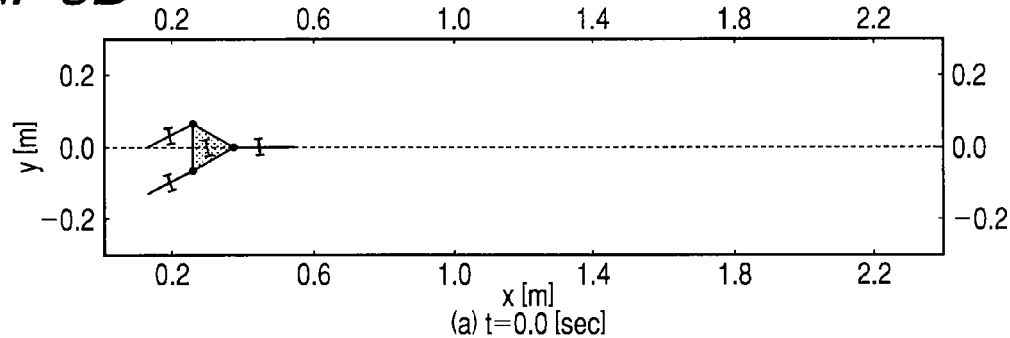
Figure 5C:
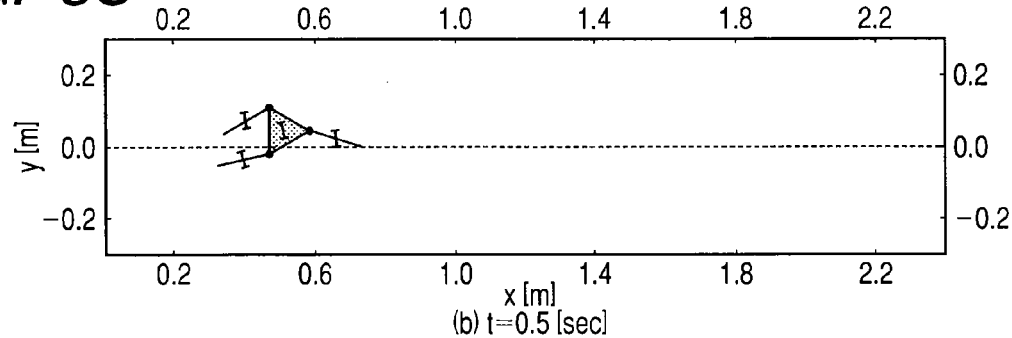
Figure 5D:
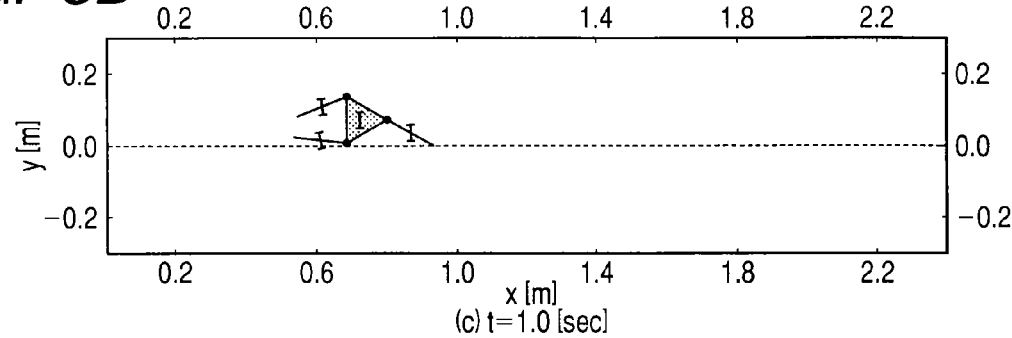
Figure 5E:
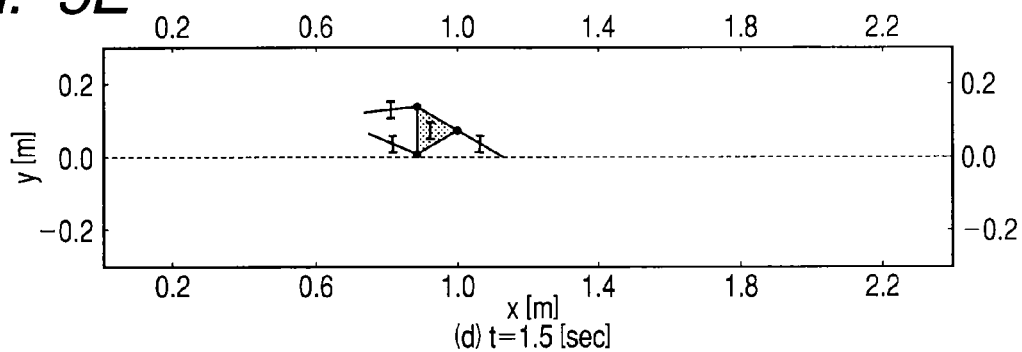
Figure 5F:
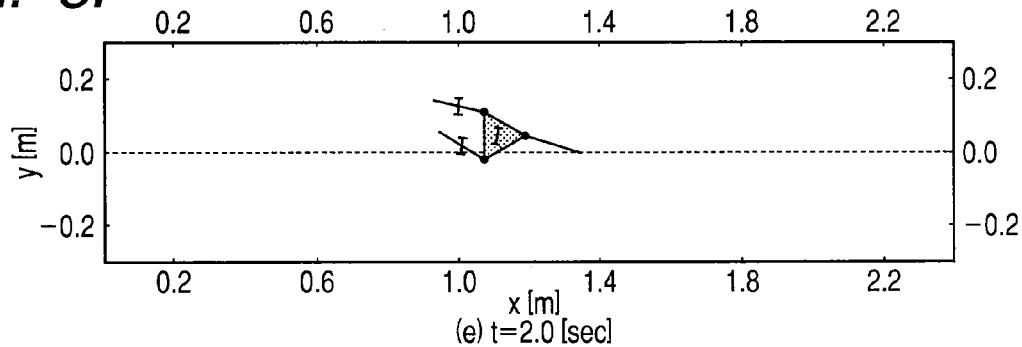
Figure 5G:
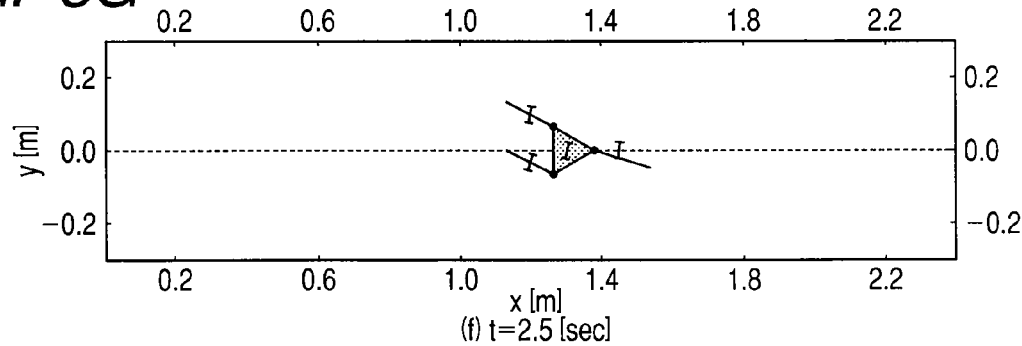
Figure 5H:
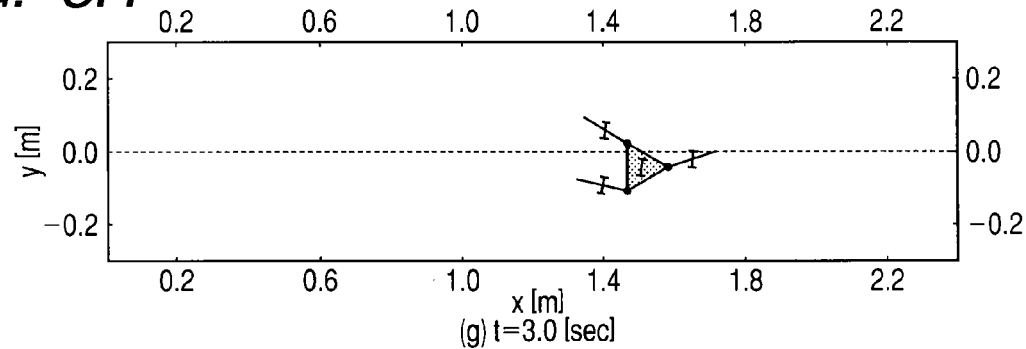
Figure 5I:
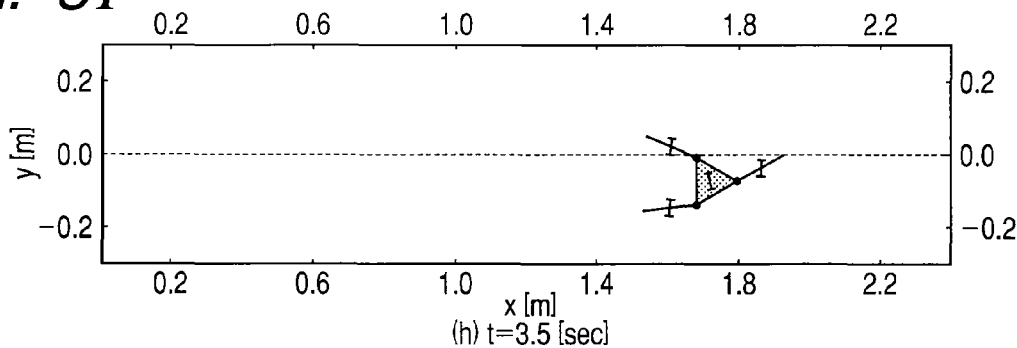
Figure 5J:
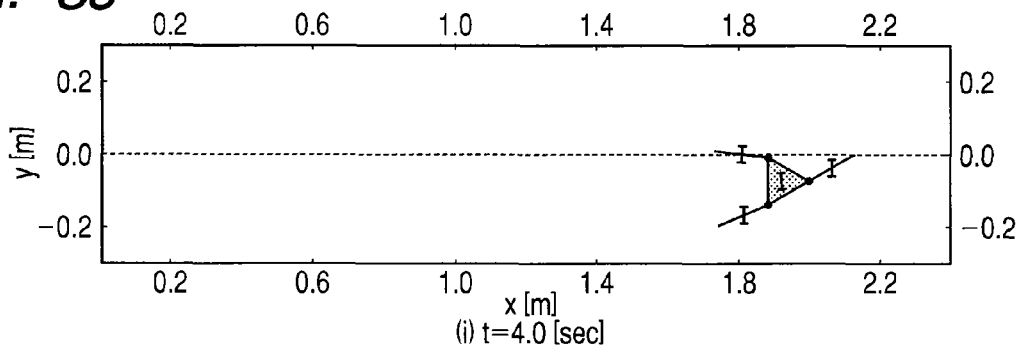
Figure 5K:
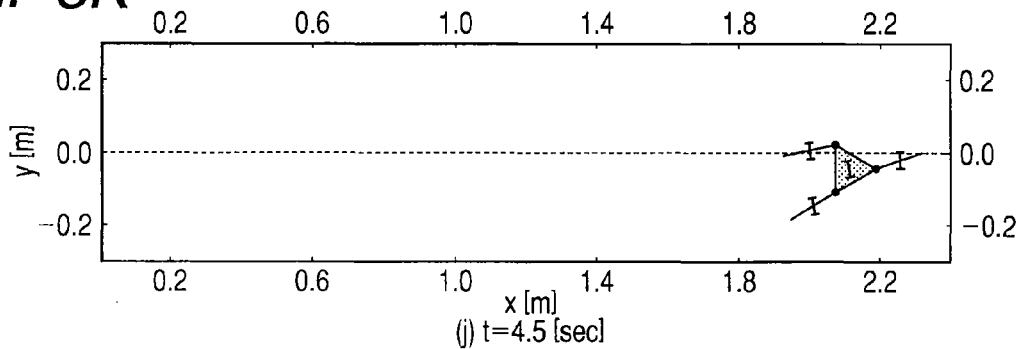

FIG. 4 shows a posture in which the posture (or orientation) of the virtual link 5A relative to the x axis is 90°. To cause the virtual link to assume a singular posture in which it forms an angle of ±90° relative to the x axis, it is necessary to prepare a different coordinate system that is formed by rotating the coordinate system about the origin by a certain angle (e.g. 90°), and switch the coordinate systems in accordance with the situation. Here, we propose a control method for causing the equilateral triangular base 1 to follow a straight path.

[4. Physical Meaning of Variables after Conversion]

In this section, the physical meaning of the variables after conversion in equations (19) will be discussed.

In this control method, the midpoint of the virtual link 5A of the three-branched mobile mechanism 10 is moved along the x axis of the coordinate system. With this movement, the equilateral triangular base 1 follows the x axis, namely follows a straight path. Therefore, variable $z_{11}$ is $x_0$ and its derivative with respect to time $\dot{x}_0$ is the displacement velocity $\tilde{u}_1$ of the midpoint of the virtual link 5A, as will be understood from equation (18). Accordingly, $\tilde{u}_1$ is always non-zero.

In this control method in particular, the virtual joint 4A, the first, second and third joints 2A, 2B and 2C of the three-branched mobile mechanism 10 are driven, and the virtual steering mechanism 5AS provided on the virtual link 5A, the steering mechanisms 3AS, 3BS and 3CS provided on the first, second and third links 3A, 3B and 3C and the steering mechanism 1S provided on the center of gravitation of the equilateral triangular base 1 are operated in such a way that $\tilde{u}_1$ is kept constant.

To move the midpoint of the virtual link 5A along the x axis, it is necessary to cause variables $z_{23}$, $z_{22}$ and $z_{21}$ to converge to zero. Variable $z_{23}$ is $y_0$, and therefore, in order to move the midpoint of the virtual link 5A onto the x axis of the coordinate system, it is necessary to make variable $z_{23}$ zero.

Furthermore, the product of variable $z_{22}$ and $\tilde{u}_1$ is $\dot{y}_0$, as will be understood from equation (18), and to make $y_0$ and $\dot{y}_0$ zero, it is necessary to make $z_{23}$ and $z_{22}$ zero.

Taking the derivative with respect to time of $\dot{y}_0$ once again yields:

$$\ddot{y}_0 = z_{21}\tilde{u}_1^2 + z_{22}\dot{\tilde{u}}_1 \qquad (22)$$

To make $y_0$ and $\dot{y}_0$ and $\ddot{y}_0$ zero, it is necessary to make $z_{23}$, $z_{22}$ and $z_{21}$ zero.

When this condition is satisfied, that is, when $z_{23}=0$, $z_{22}=0$ and $z_{21}=0$, the following conditions follow from equations (19).

$$y_0=0, \theta_0=0, \phi_0=0. \qquad (23)$$

This equations (23) mean that the midpoint of the virtual link 5A is located on the x axis, and the posture or orientation thereof is parallel to the x axis, and the steering angle of its virtual steering mechanism 5AS is zero. In other words, they mean that the virtual link 5A moves along the x axis.

Furthermore, other variable $z_{32}$, $z_{31}$, $z_{42}$, $z_{41}$, $z_{52}$, $z_{51}$, $z_{62}$, and $z_{61}$ will be discussed. Variable $z_{32}$ is the angle $\psi_0$ of the virtual joint 4A. Variables $z_{42}$, $z_{52}$ and $z_{62}$ are the angle $\psi_1$, $\psi_2$ and $\psi_3$ of the first, second and third joints 2A, 2B and 2C.

As has been described in section 2.2, when angular velocity inputs $v_1$, $v_2$ and $v_3$ are given as the angular velocities $\dot{\psi}_1$, $\dot{\psi}_2$ and $\dot{\psi}_3$ of driving of the first, second and third joints 2A, 2B and 2C the displacement speed $u_1$ is determined in such a way that equations (14) are satisfied. Strictly speaking, if the three-branched mobile mechanism 10 does not have singular posture 2, $u_1$ is determined uniquely.

In this control method, the displacement speed $\tilde{u}_1$ of the midpoint of the virtual link 5A with respect to the x axis ($\tilde{u}_1=u_1 \cos \theta_0$) is assumed to be a constant value other than zero. Therefore, $\tilde{u}_1$ is not zero. This means that in order to displace the three-branched mobile mechanism 10, it is necessary that at least one of the first, second and third joints 2A, 2B and 2C is driven at any time, as will be understood from equations (14).

Therefore, it is necessary to change the angles $\psi_1(=z_{42})$, $\psi_2(=z_{52})$ and $\psi_3(=z_{62})$ of these three joints 2A, 2B and 2C periodically while preventing the three-branched mobile mechanism 10 from assuming singular postures 1, 2 and 3. In this case, variables $z_{41}$, $z_{51}$ and $z_{61}$ also change periodically. The angle $\psi_0(=z_{32})$ of the virtual joint 4A should also be changed periodically if need be. In this case, variable $z_{31}$ will also change periodically.

In the next chapter, we propose a feedback control method for causing variables $z_{23}$, $z_{22}$ and $z_{21}$ to converge to zero and causing variables $z_{32}$, $z_{42}$, $z_{52}$ and $z_{62}$ to converge to target periodic functions.

[5. Control Input and Stability Thereof]

In this chapter, we propose a feedback control method in which the virtual joint 4A, the first, second and third joints 2A, 2B and 2C of the three-branched mobile mechanism 10 are driven, and the virtual steering mechanism 5AS provided on the virtual link 5A, the steering mechanisms 3AS, 3BS and 3CS provided on the first, second and third links 3A, 3B and 3C and the steering mechanism 1S provided on the center of gravitation of the equilateral triangular base 1 are operated in such a way that the midpoint of the virtual link 5A of the three-branched mobile mechanism 10 moves along the x axis of the coordinate system, in other words in such a way that the equilateral triangular base 1 follows the x axis.

As has already been described in the above chapter 4, to achieve the aforementioned movement along the axis, it is necessary to cause variables $z_{23}$, $z_{22}$ and $z_{21}$ to converge to zero.

To this end, by setting:

$$w_1 = a_0, \tag{24}$$

control input w2 is given as follows:

$$w_2 = p_{21} z_{21} + p_{22} \frac{z_{22}}{a_0} + p_{23} \frac{z_{23}}{a_0^2}. \tag{25}$$

In the above equation (24), $a_0$ is a constant value not equal to zero, and it means, physically, the displacement speed $\tilde{u}_1$ of the midpoint of the virtual link 5A with respect to the x axis ($\tilde{u}_1 = u_1 \cos \theta_0$). That is:

$$\dot{x}_0 = \tilde{u}_1 = w_1 = a_0 \neq 0$$

The displacement speed $u_1 (= \tilde{u}_1 / \cos \theta_0)$ of the virtual link 5A is not zero, and therefore the angular velocities $\dot{\psi}_1$, $\dot{\psi}_2$ and $\dot{\psi}_3$ of driving of the first, second and third joints 2A, 2B and 2C are determined uniquely from equations (14), namely, the angular velocity inputs $v_1$, $v_2$ and $v_3$ are determined from equations (14). The angular velocity $\dot{\psi}_0$ of driving of the virtual joint 4A is determined uniquely from equation (15), namely, the angular velocity input $v_0$ is uniquely determined from equation (15). In this case, for three dimensional vector $\zeta_2$ defined in equation (26) below, its derivative with respect to time $\dot{\zeta}_2$ is given by equation (27).

$$\zeta_2 = (\zeta_{21}, \zeta_{22}, \zeta_{23})^T = \left( z_{21}, \frac{z_{22}}{a_0}, \frac{z_{23}}{a_0^2} \right)^T \tag{26}$$

$$\dot{\zeta}_2 = \begin{pmatrix} p_{21} & p_{22} & p_{23} \\ 1 & 0 & 0 \\ 0 & 1 & 0 \end{pmatrix} \zeta_2 = \Lambda_2 \zeta_2. \tag{27}$$

Giving coefficients $p_{21}$, $p_{22}$ and $p_{23}$ that make all the real part of the eigenvalue of matrix $\Lambda_2$ negative causes vector $\zeta_2$ to converge exponentially to zero, whereby movement following the x axis is achieved.

Needless to say, to follow the x axis, it is necessary for the three-branched mobile mechanism 10 to continue to move. In other words, it is necessary that at least one of the first, second and third joints 2A, 2B and 2C is driven and the condition $w_1 = a_0 \neq 0$ be met at any time.

Therefore, it is necessary to change the angles $\psi_1 (= z_{42})$, $\psi_2 (= z_{52})$ and $\psi_3 (= z_{62})$ of these three joints 2A, 2B and 2C periodically while preventing the three-branched mobile mechanism 10 from assuming singular postures 1, 2 and 3.

The angle of the virtual joint 4A $\psi_0 (= z_{32})$ should also be changed periodically if need be. To this end, the following control inputs $w_3$, $w_4$, $w_5$ and $w_6$ are given.

$$\begin{cases} w_3 = p_{31} z_{31} + p_{32} \frac{z_{32}}{a_0} + e_3 \\ w_4 = p_{41} z_{41} + p_{42} \frac{z_{42}}{a_0} + e_4 \\ w_5 = p_{51} z_{51} + p_{52} \frac{z_{52}}{a_0} + e_5 \\ w_6 = p_{61} z_{61} + p_{62} \frac{z_{62}}{a_0} + e_6. \end{cases} \tag{28}$$

Values $e_3$, $e_4$, $e_5$ and $e_6$ in equations (28) are vibrational terms shown in equations (29) presented below.

$$\begin{cases} e_3 = A_3 \sin(\omega_3 t + \varphi_3) \\ e_4 = A_4 \sin(\omega_4 t + \varphi_4) \\ e_5 = A_5 \sin(\omega_5 t + \varphi_5) \\ e_6 = A_6 \sin(\omega_6 t + \varphi_6). \end{cases} \tag{29}$$

In this case, for two dimensional vector $\zeta_3$ defined in equation (30) below, its derivative with respect to time $\dot{\zeta}_3$ is given by equation (31).

$$\zeta_3 = (\zeta_{31}, \zeta_{32})^T = \left( z_{31}, \frac{z_{32}}{a_0} \right)^T \tag{30}$$

$$\dot{\zeta}_3 = \begin{pmatrix} p_{31} & p_{32} \\ 1 & 0 \end{pmatrix} \zeta_3 + \begin{pmatrix} A_3 \sin(\omega_3 t + \varphi_3) \\ 0 \end{pmatrix} \tag{31}$$

$$= \Lambda_3 \zeta_3 + \begin{pmatrix} 1 \\ 0 \end{pmatrix} A_3 \sin(\omega_3 t + \varphi_3).$$

Similarly, for two dimensional vectors $\zeta_4$, $\zeta_5$ and $\zeta_6$ defined in equations (32), (34) and (36) below, their derivatives with respect to time $\dot{\zeta}_4$, $\dot{\zeta}_5$ and $\dot{\zeta}_6$ are given by equations (33), (35) and (37) respectively.

$$\zeta_4 = (\zeta_{41}, \zeta_{42})^T = \left( z_{41}, \frac{z_{42}}{a_0} \right)^T \tag{32}$$

$$\dot{\zeta}_4 = \begin{pmatrix} p_{41} & p_{42} \\ 1 & 0 \end{pmatrix} \zeta_4 + \begin{pmatrix} A_4 \sin(\omega_4 t + \varphi_4) \\ 0 \end{pmatrix} \tag{33}$$

$$= \Lambda_4 \zeta_4 + \begin{pmatrix} 1 \\ 0 \end{pmatrix} A_4 \sin(\omega_4 t + \varphi_4).$$

$$\zeta_5 = (\zeta_{51}, \zeta_{52})^T = \left( z_{51}, \frac{z_{52}}{a_0} \right)^T \tag{34}$$

$$\dot{\zeta}_5 = \begin{pmatrix} p_{51} & p_{52} \\ 1 & 0 \end{pmatrix} \zeta_5 + \begin{pmatrix} A_5 \sin(\omega_5 t + \varphi_5) \\ 0 \end{pmatrix} \tag{35}$$

$$= \Lambda_5 \zeta_5 + \begin{pmatrix} 1 \\ 0 \end{pmatrix} A_5 \sin(\omega_5 t + \varphi_5).$$

$$\zeta_6 = (\zeta_{61}, \zeta_{62})^T = \left( z_{61}, \frac{z_{62}}{a_0} \right)^T \tag{36}$$

$$\dot{\zeta}_6 = \begin{pmatrix} p_{61} & p_{62} \\ 1 & 0 \end{pmatrix} \zeta_6 + \begin{pmatrix} A_6 \sin(\omega_6 t + \varphi_6) \\ 0 \end{pmatrix} \tag{37}$$

$$= \Lambda_6 \zeta_6 + \begin{pmatrix} 1 \\ 0 \end{pmatrix} A_6 \sin(\omega_6 t + \varphi_6).$$

Giving such coefficients $p_{31}$, $p_{32}$, $p_{41}$, $p_{42}$, $p_{51}$, $p_{52}$, $p_{61}$, and $p_{62}$ that make all the real parts of the eigenvalues of matrices $\Lambda_3$, $\Lambda_4$, $\Lambda_5$ and $\Lambda_6$ in equations (31), (33), (35) and (37) negative causes the angles $\psi_0 (= z_{32})$ $\psi_1 (= z_{42})$, $\psi_2 (= z_{52})$ and $\psi_3 (= z_{62})$ of the virtual joint 4A and the first, second and third joints 2A, 2B and 2C to converge respectively to periodic functions $r_3$, $r_4$, $r_5$ and $r_6$ as shown in equations (38) presented below.

$$\psi_0 = z_{32} = r_3 = \hat{A}_3 \sin(\hat{\omega}_3 t + \hat{\varphi}_3) \tag{38}$$

$$\psi_1 = z_{42} = r_4 = \hat{A}_4 \sin(\hat{\omega}_4 t + \hat{\varphi}_4)$$

-continued $$\psi_2 = z_{52} = r_5 = \hat{A}_5 \sin(\hat{\omega}_5 t + \hat{\varphi}_5)$$

$$\psi_3 = z_{62} = r_6 = \hat{A}_6 \sin(\hat{\omega}_6 t + \hat{\varphi}_6).$$

The angular frequencies $\hat{\omega}_3, \hat{\omega}_4, \hat{\omega}_5$ and $\hat{\omega}_6$ of these periodic functions $r_3, r_4, r_5$ and $r_6$ are $\omega_3, \omega_4, \omega_5$ and $\omega_6$ respectively, namely, $\hat{\omega}_3 = \omega_3, \hat{\omega}_4 = \omega_4, \hat{\omega}_5 = \omega_5$ and $\hat{\omega}_6 = \omega_6$.

The amplitude $\hat{A}_3, \hat{A}_4, \hat{A}_5$ and $\hat{A}_6$ and the phases $\hat{\varphi}_3, \hat{\varphi}_4, \hat{\varphi}_5$ and $\hat{\varphi}_6$ of these periodic functions $r_3, r_4, r_5$ and $r_6$ are functions of the amplitudes $A_3, A_4, A_5$ and $A_6$ and the phases $\varphi_3, \varphi_4, \varphi_5$ and $\varphi_6$ of the vibrational terms $e_3, e_4, e_5$ and $e_6$ in the control inputs presented as equations (28).

Therefore, the amplitudes $\hat{A}_3, \hat{A}_4, \hat{A}_5$ and $\hat{A}_6$, the angular frequencies $\hat{\omega}_3, \hat{\omega}_4, \hat{\omega}_5$ and $\hat{\omega}_6$ and the phases $\hat{\varphi}_3, \hat{\varphi}_4, \hat{\varphi}_5$ and $\hat{\varphi}_6$ of the periodic functions $r_3, r_4, r_5$ and $r_6$ are designed using above-mentioned $A_3, A_4, A_5, A_6, \omega_3, \omega_4, \omega_5, \omega_6, \varphi_3, \varphi_4, \varphi_5$ and $\varphi_6$ in such a way that the three-branched mobile mechanism 10 can continue to move while being prevent from assuming singular postures 1, 2 and 3.

[6. Simulation]

In this chapter, the efficacy of the control method enabling to cause the equilateral base 1 of the three-branched mobile mechanism 10 to follow the x axis will be demonstrated by simulation.

In the simulation described here, all of the virtual link 5A and the first, second and third links 3A, 3B and 3C are designed to have a length of 0.15 meter (l=0.075 meter).

The displacement speed $\tilde{u}_1$ of the midpoint of the virtual link 5A of the three-branched mobile mechanism 10 was set as follows.

$$\dot{x}_0 = \tilde{u}_1 = w_1 = a_0 = 0.4 \text{ [m/sec]}$$

The coefficients in equations (25) and (28) that represent control inputs were determined as follows:

$$p_{21} = -3.0, \quad p_{22} = -\frac{p_{21}^2}{3.0} = -3.0, \quad p_{23} = \frac{p_{21}^3}{27.0} = -1.0,$$

$$p_{31} = -2.0, \quad p_{32} = -p_{31}^2/4.0 = -1.0,$$

$$p_{41} = -2.0, \quad p_{42} = -p_{41}^2/4.0 = -1.0,$$

$$p_{51} = -2.0, \quad p_{52} = -p_{51}^2/4.0 = -1.0,$$

$$p_{61} = -2.0, \quad p_{62} = -p_{61}^2/4.0 = -1.0.$$

Under these conditions, all the engenvalues of the matrices $\Lambda_2, \Lambda_3, \Lambda_4, \Lambda_5$ and $\Lambda_6$ in equations (27), (31), (33), (35) and (37) become $-1.0$. The amplitudes $\hat{A}_3, \hat{A}_4, \hat{A}_5$ and $\hat{A}_6$, the angular frequencies $\hat{\omega}_3, \hat{\omega}_4, \hat{\omega}_5$ and $\hat{\omega}_6$ and the phases $\hat{\varphi}_3, \hat{\varphi}_4, \hat{\varphi}_5$ and $\hat{\varphi}_6$ of the periodic functions $r_3, r_4, r_5$ and $r_6$ in equations (38) to which the angles $\psi_0 (=z_{32}) \psi_1 (=z_{42}), \psi_2 (=z_{52})$ and $\psi_3 (=z_{62})$ of the virtual joint 4A and the first, second and third joints 2A, 2B and 2C converge were set as follows.

$$\hat{A}_3 = \pi/6[\text{rad}], \quad \hat{\omega}_3 = 2\pi/5[\text{rad/sec}], \quad \hat{\varphi}_3 = 0[\text{rad}],$$

$$\hat{A}_4 = \pi/6[\text{rad}], \quad \hat{\omega}_4 = 2\pi/5[\text{rad/sec}], \quad \hat{\varphi}_4 = \pi[\text{rad}],$$

$$\hat{A}_5 = \pi/6[\text{rad}], \quad \hat{\omega}_5 = 2\pi/5[\text{rad/sec}], \quad \hat{\varphi}_5 = \pi/3[\text{rad}],$$

$$\hat{A}_6 = \pi/6[\text{rad}], \quad \hat{\omega}_6 = 2\pi/5[\text{rad/sec}], \quad \hat{\varphi}_6 = 2\pi/3[\text{rad}].$$

Then, the amplitudes $A_3, A_4, A_5$ and $A_6$ and the phases $\varphi_3, \varphi_4, \varphi_5$ and $\varphi_6$ of the vibrational terms $e_3, e_4, e_5$ and $e_6$ in the control inputs presented in equations (29) are given as follows.

$$A_3 = \hat{A}_3(4\hat{\omega}_3^2 + p_{31}^2)/(4\alpha_0), \quad \omega_3 = \hat{\omega}_3,$$

$$A_4 = \hat{A}_4(4\hat{\omega}_4^2 + p_{41}^2)/(4\alpha_0), \quad \omega_4 = \hat{\omega}_4,$$

$$A_5 = \hat{A}_5(4\hat{\omega}_5^2 + p_{51}^2)/(4\alpha_0), \quad \omega_5 = \hat{\omega}_5,$$

$$A_6 = \hat{A}_6(4\hat{\omega}_6^2 + p_{61}^2)/(4\alpha_0), \quad \omega_6 = \hat{\omega}_6.$$

$$\varphi_3 = \hat{\varphi}_3 - \operatorname{atan2}\{4\hat{\omega}_3 p_{31}/(-4\hat{\omega}_3^2 + p_{31}^2)\},$$

$$\varphi_4 = \hat{\varphi}_4 - \operatorname{atan2}\{4\hat{\omega}_4 p_{41}/(-4\hat{\omega}_4^2 + p_{41}^2)\},$$

$$\varphi_5 = \hat{\varphi}_5 - \operatorname{atan2}\{4\hat{\omega}_5 p_{51}/(-4\hat{\omega}_5^2 + p_{51}^2)\},$$

$$\varphi_6 = \hat{\varphi}_6 - \operatorname{atan2}\{4\hat{\omega}_6 p_{61}/(-4\hat{\omega}_6^2 + p_{61}^2)\}.$$

In this way, by appropriately designing the amplitudes $\hat{A}_3, \hat{A}_4, \hat{A}_5$ and $\hat{A}_6$, the angular frequencies $\hat{\omega}_3, \hat{\omega}_4, \hat{\omega}_5$ and $\hat{\omega}_6$ and the phases $\hat{\varphi}_3, \hat{\varphi}_4, \hat{\varphi}_5$ and $\hat{\varphi}_6$ of the periodic functions $r_3, r_4, r_5$ and $r_6$, it is possible to cause the three-branched mobile mechanism to move while preventing it from assuming singular postures 1, 2 and 3.

As initial conditions, the initial position $(x_0, y_0)^T|_{t=0}$ of the virtual link 5A, the initial posture $\theta_0|_{t=0}$ of the virtual link 5A, the initial angle $\phi_0|_{t=0}$ of the virtual steering mechanism 5AS on the virtual link 5A, the initial posture $\theta_1|_{t=0}$ of the first link 3A, the initial angle $\phi_1|_{t=0}$ of the virtual steering mechanism 3AS of the first link, the initial posture $\theta_b|_{t=0}$ of the equilateral triangular base 1, the initial angle $\phi_b|_{t=0}$ of the steering mechanism 1S on the base 1, the initial posture $\theta_2|_{t=0}$ of the second link 3B, the initial angle $\phi_2|_{t=0}$ of the steering mechanism 3BS on the second link 3B, the initial posture $\theta_3|_{t=0}$ of the third link 3C and the initial angle $\phi_3|_{t=0}$ of the steering mechanism 3CS of the third link 3C were given as follows.

| | |
|---|---|
| $(x_0, y_0)^T\|_{t=0} = (0.6[\text{m}], 0.0[\text{m}])^T,$ | |
| $\theta_0\|_{t=0} = 0.0[\text{rad}],$ | $\phi_0\|_{t=0} = 0.0[\text{rad}],$ |
| $\theta_1\|_{t=0} = 0.0[\text{rad}],$ | $\phi_1\|_{t=0} = 0.1227498[\text{rad}],$ |
| $\theta_b\|_{t=0} = 0.0[\text{rad}],$ | $\phi_b\|_{t=0} = 0.2419082[\text{rad}],$ |
| $\theta_2\|_{t=0} = 0.4534498[\text{rad}],$ | $\phi_2\|_{t=0} = -0.2693041[\text{rad}],$ |
| $\theta_3\|_{t=0} = 0.4534498[\text{rad}],$ | $\phi_3\|_{t=0} = -0.1523114[\text{rad}].$ |

In this initial state, the midpoint of the virtual link 5A is located on the x axis, its posture or orientation is parallel to the x axis, and the steering angle of the steering mechanism 5AS thereon is zero. In addition, the angles $\psi_0(=z_{32}), \psi_1(=z_{42}), \psi_2(=z_{52})$ and $\psi_3(=z_{62})$ of the virtual joint 4A and the first, second and third joints 2A, 2B and 2C have converged to periodic functions $r_3, r_4, r_5$ and $r_6$.

Results of this simulation are shown in FIGS. 5A to 5K and 6A to 6C.

This simulation gives angular velocities $\dot{\psi}_1, \dot{\psi}_2$ and $\dot{\psi}_3$ of driving of the first, second and third joints 2A, 2B and 2C, the angular velocities $\dot{\phi}_1, \dot{\phi}_2, \dot{\phi}_3$ and $\dot{\phi}_b$ of operating the steering mechanisms 3AS, 3BS and 3CS on the first, second and third links 3A, 3B and 3C and the steering mechanism 1S of the equilateral triangular base 1 that are calculated from $\tilde{u}_1, \tilde{u}_2, \tilde{u}_3, \tilde{u}_4, \tilde{u}_5$ and $\tilde{u}_6$ in the kinematic equations (equations (20)) of the three-branched mobile mechanism having virtual mechanical elements shown in FIG. 3 for the kinematic equations (equations (3) and (4)) of the three-branched mobile mechanism 10 shown in FIG. 1. It will be understood from FIGS. 5A to 5K that the tip end of the first link 3A always moves along the x axis. This means that the virtual link 5A connected to the tip end of the first link 3A by means of the virtual joint 4A moves along the x axis. The displacement speed thereof is $\tilde{u}_1=w_1=a_0=0.4$ [m/sec]. Thus, movement of the equilateral triangular base 1 following the x axis is achieved.

It will also be understood from FIGS. 5A to 5K that the equilateral triangular base 1 always keeps a posture parallel to the x axis. This is because the amplitude $\hat{A}_3$ and the angular frequency $\hat{\omega}_3$ of the periodic function $r_3$ to which the angle $\psi_0(=z_{32})$ of the virtual joint 4A converges is designed to be equal respectively to the amplitude $\hat{A}_4$ and the angular frequency $\hat{\omega}_4$ of the periodic function $r_4$ to which the angle $\psi_1(=z_{42})$ of the first joint 2A converges, and the phase difference $(\hat{\phi}_3-\hat{\phi}_4)$ between these periodic functions $r_3$ and $r_4$ is designed to be $-\pi$ [rad].

Figure 6A:
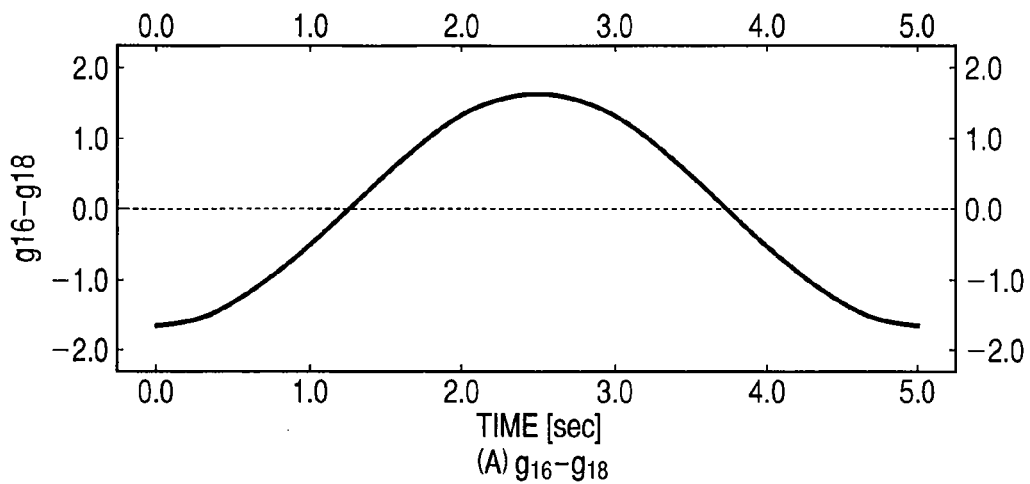
FIGS. 6A, 6B and 6C are graphs showing changes with time in coefficients in the above-mentioned simulation performed on the three-branched mobile mechanism according to the above-mentioned embodiment.
Figure 6B:
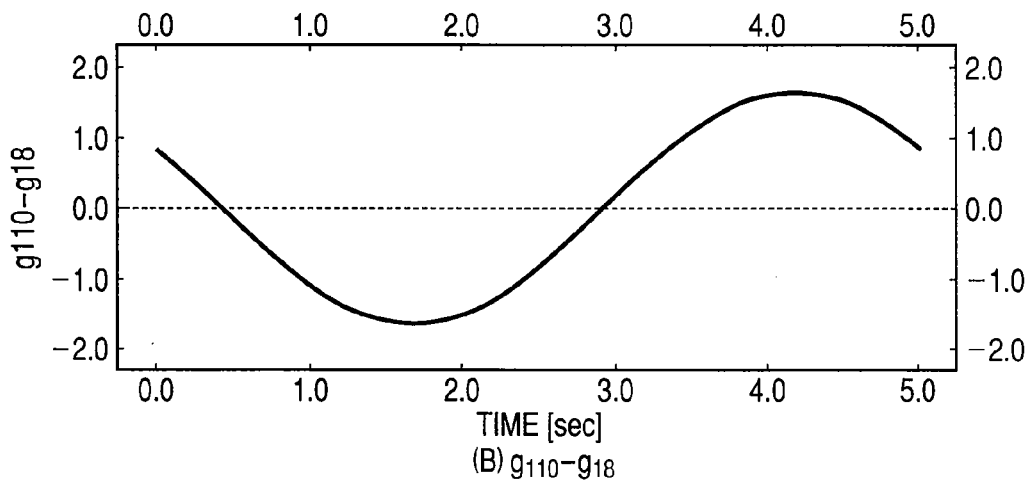
Figure 6C:
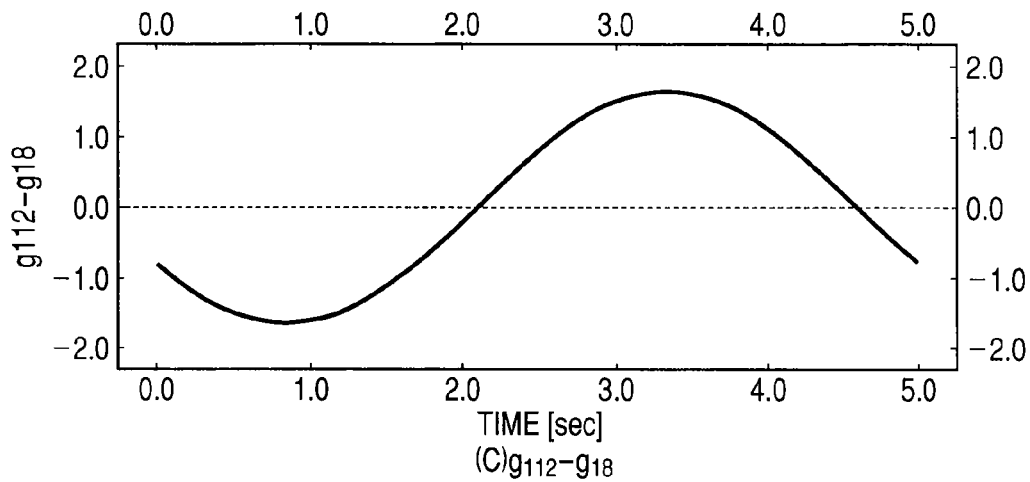

It is also understood from FIGS. 6A to 6C that the three-branched mobile mechanism 10 moves while being prevented from assuming singular posture 2. The three-branched mobile mechanism 10 is also prevented from assuming singular postures 1 and 3, needless to say.

As per the above, from the simulation results shown in FIGS. 5A to 5K and 6A to 6C, efficacy of this control method that makes it possible to cause the equilateral triangular base 1 of the three-branched mobile mechanism 10 to follow the x axis has been verified.

As has been described in the foregoing, according to the present invention, there are proposed a three-branched mobile mechanism having four steering mechanisms and a feedback control method therefor. As to such a three-branched mobile mechanism, the fact that the kinematic equations thereof can be converted into five-chain, single-generator chained form by assuming the presence of a virtual joint, a virtual link, a virtual axle of the virtual link, a virtual passive wheels mounted on the virtual axle and a virtual steering mechanism has been demonstrated by showing calculation.

Furthermore, a feedback control method that enables tracking on a straight path has been proposed based on this chained form.

By driving three joints and operating four steering mechanisms, it is possible to cause this three-branched mobile mechanism to follow a straight path smoothly.

Excellence of the design of the three-branched mobile mechanism, the fact that the kinematic equations thereof can be converted into chained form, and efficacy of the feedback control method that enables tracking on a straight path have been verified by simulation.

Figure 7A:
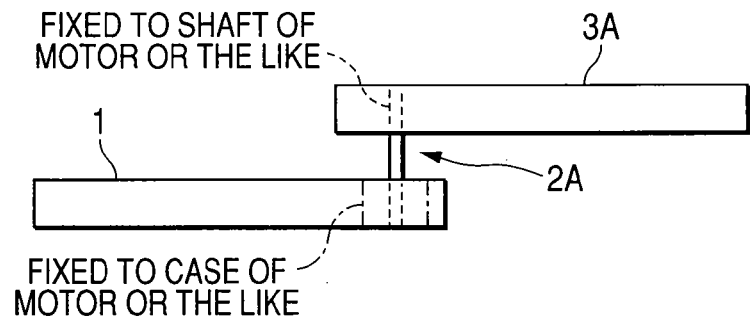
FIGS. 7A, 7B and 7C show exemplary joint structures in the three-branched mobile mechanism according to the above-mentioned embodiment.
Figure 7B:
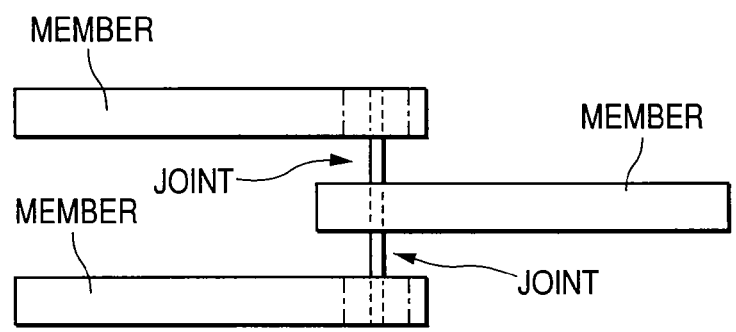
Figure 7C:
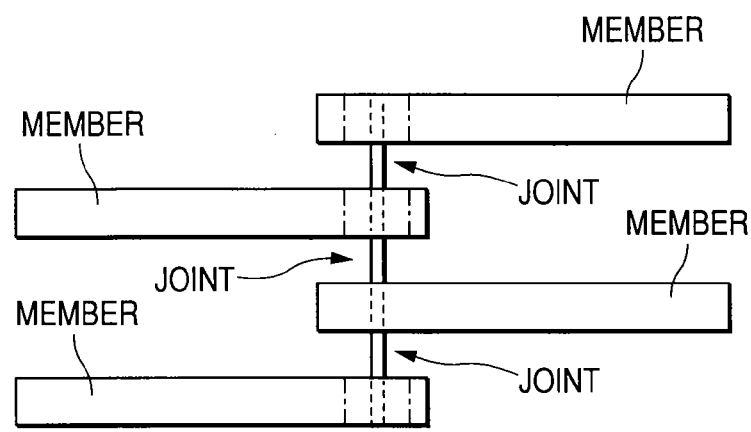
Figure 8A:
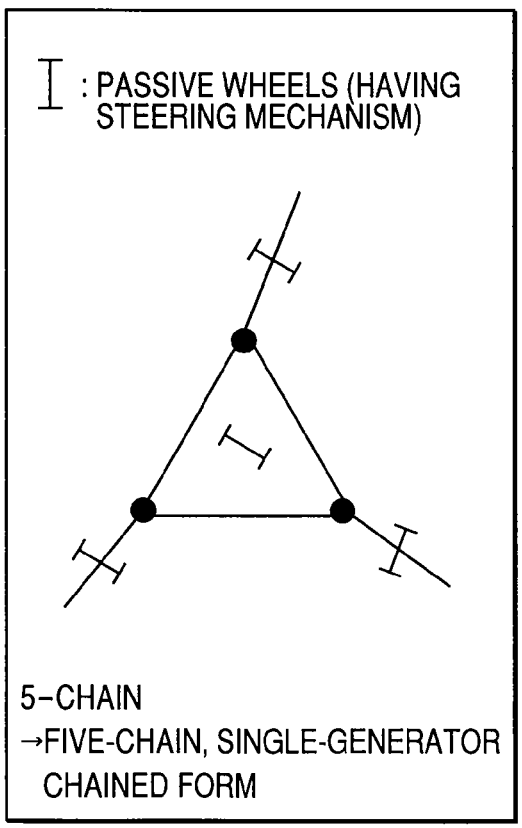
FIGS. 8A and 8B illustrates multi-chain, single-generator chained form taking as examples five-chain, single-generator chained form and four-chain, single-generator chained form.
Figure 8B:
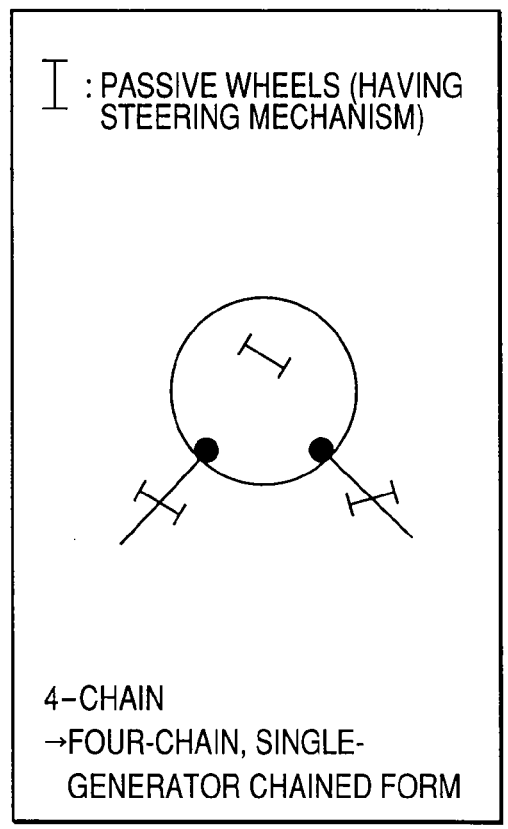

In the following, an exemplary structure of the joint according to this embodiment will be described taking a joint 2A as an example. As shown in FIG. 7A, the joint 2A for connecting a link 3A to the base 1 can be constructed by fixedly attaching the case of a motor or the like serving as an actuator to the base 1 and fixedly attaching the rotor shaft of the motor or the like to the link 3A. In connection with this, a plurality of members may be coupled by a coaxial joint in such a way that they can pivot relative to each other, as shown in FIGS. 7B and 7C. These structure are proposed only by way of example, and other connecting structures may also be used.

In the foregoing, discussion has been made with reference to the three-branched mobile mechanism 10 as shown in FIG. 1 by way of example, and it was demonstrated that the kinematic equations of the mobile mechanism can be converted into five-chain, single-generator chained form. However, the present invention can be applied to mobile mechanisms having links equipped with a steering mechanism that perform other types of undulatory locomotion. In other words, the present invention is not limited to the five-chain, single-generator chained form, but conversion into multi-chain, single-generator chained form is also possible.

The mobile mechanism and the control method according to the present invention can be applied to situations in which there are action and reaction acting between steer wheels (passive wheels) of steering mechanisms and something to be in contact therewith. Therefore, the present invention can be applied, for example, to a case where what is in contact with the steer wheels is a fluid (e.g. water). For example, by replacing the steer wheels (passive wheels) of the steering mechanisms in the above described embodiment with plate-like steer plates that can exchange action and reaction with fluid and submerging the steer plates at least partly in the fluid (which can be realized by adjusting buoyancy by providing a float(s) separately from the steer plates, forming floats in the form of steer plates or providing steer plates on the lower side of floats), it is possible to move or turn the mobile mechanism according to the present invention relative to the fluid. Any element, including such a steer plate and the above described steer wheel that can exchange action and reaction with something in contact therewith as the mobile mechanism moves can be called a passive element.

Here, the above described virtual link 5A constitutes the virtual member according to the present invention, and the above described virtual axle 5AX of the virtual link 5A and the virtual passive wheel 5W mounted on the virtual axle 5AX constitute the virtual element according to the present invention. Furthermore, the above described virtual steering mechanism 5AS is an example of the virtual steering mechanism according to the present invention, and the passive element (i.e. the passive wheel) of the virtual steering mechanism 5AS is an example of the passive steering element of the virtual steering mechanism according to the present invention.

Although the foregoing description has been directed to an embodiment with the base 1 having an equilateral triangular shape (specifically, a structure having three joints provided respectively at the vertexes of the equilateral triangle) to facilitate calculation, this is not a limitation, but the base 1 may have a shape other than the equilateral triangle, and the arrangement of the joints may also be modified. Furthermore, although an arrangement including three joints and three links has been described in the above description of the embodiment as a representative example, this is not a limitation.

Although the links of the above described embodiment have the same length, the lengths of the links may differ from each other, and they may have not only a straight shape but also other various shapes such as an angled shape, a circular shape and an elliptic shape. Although in the above described embodiment, the steer wheels (passive elements) of the steering mechanism is disposed at the center of gravity of the base or each link, this is not a limitation, but the steer wheels (passive wheels) of the steering mechanism may be disposed at a position other than the center of gravitation.

In the above-described embodiment, a steering mechanism 1S is provided on the base 1. This steering mechanism 1S is provided in order to prevent the above described singular postures 1 and 2, and it may be eliminated (see FIG. 9A) in cases where the singular postures do not matter for the reason, for example, that high control accuracy is not required, as is the case with a case the mobile mechanism according to this embodiment is used as a toy. For example, instead of the steering mechanism, a shape or a structure (such as a convex shape, a hemispherical shape or a spherical roller) that supports the weight but hardly exerts resistance against movement of the mobile mechanism may be provided on the base portion.

In the present invention, the link and the base may be considered as members in a generic sense. Therefore, the present invention can be applied to all the mobile mechanisms having a plurality of members connected via joints that are at least moved or rotated by causing said plurality of members to swing about pivot axes provided by the joints and have a steering mechanism provided on at least one of the aforementioned plurality of members that enables steering of a passive element relative to the corresponding member, and smooth undulatory locomotion of the mobile mechanism can be realized by the present invention.

Figure 11:
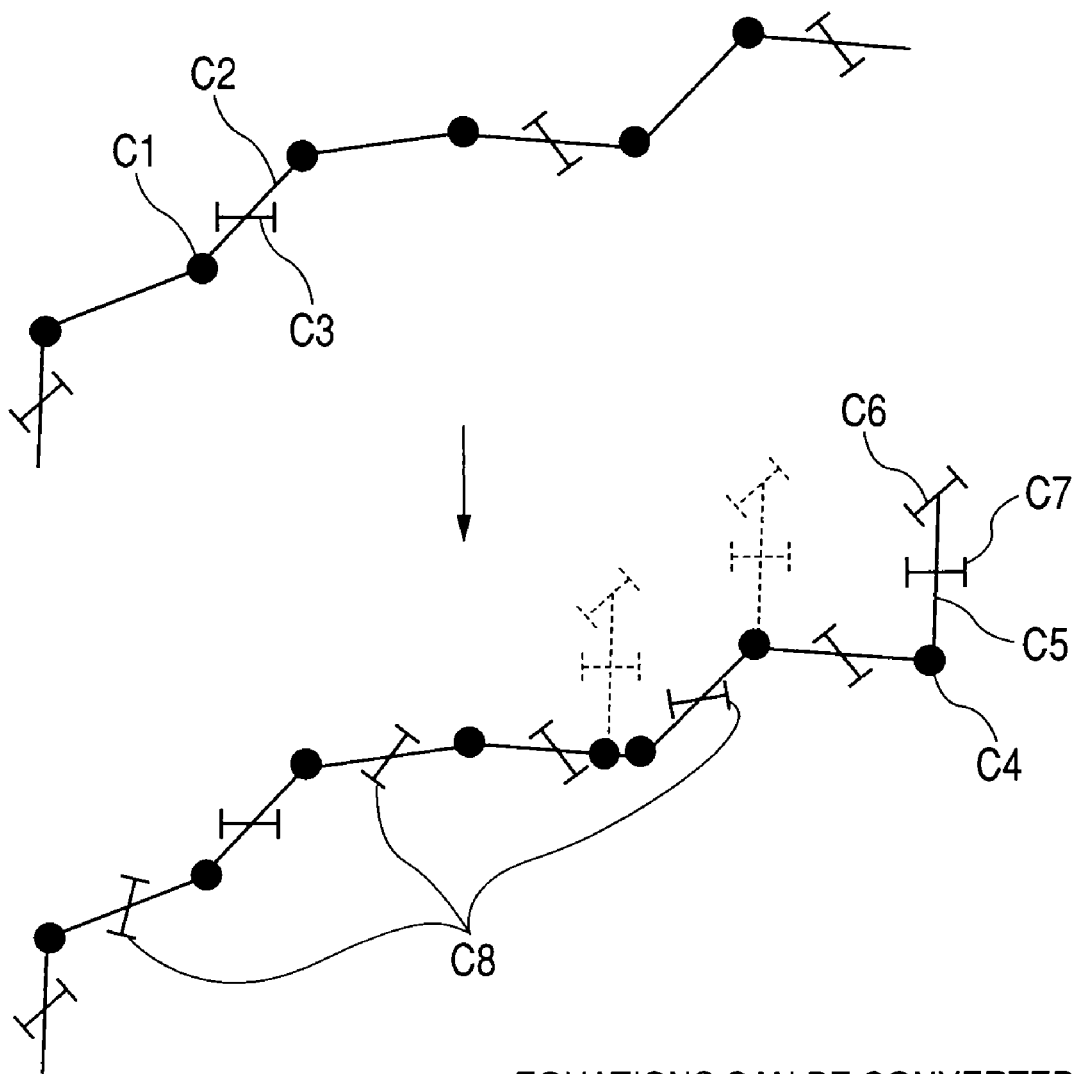
FIG. 11 shows an exemplary structure of a mobile mechanism in which a plurality of members are connected in a row and illustrates conversion of kinematic equations of the mobile mechanism into multi-chain, single-generator chained form.
Figure 12A:
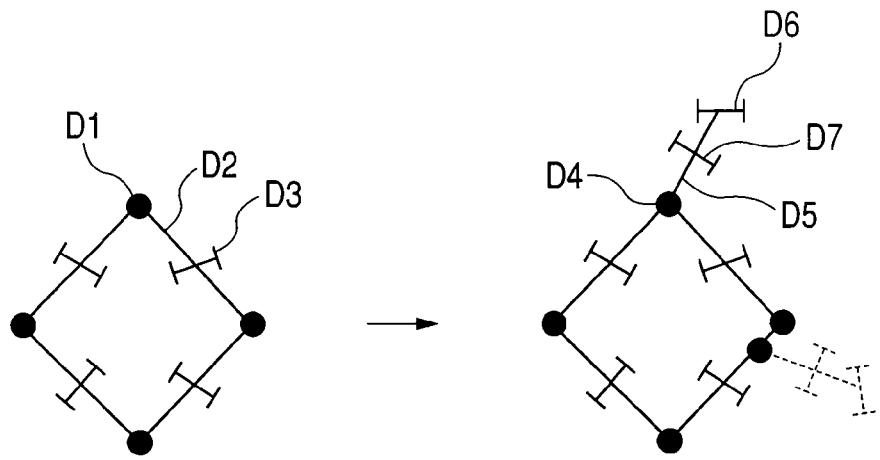
FIGS. 12A and 12B show an exemplary structure of a mobile mechanism in which a plurality of members are connected in a closed loop and illustrates conversion of kinematic equations of the mobile mechanism into multi-chain, single-generator chained form.
Figure 12B:
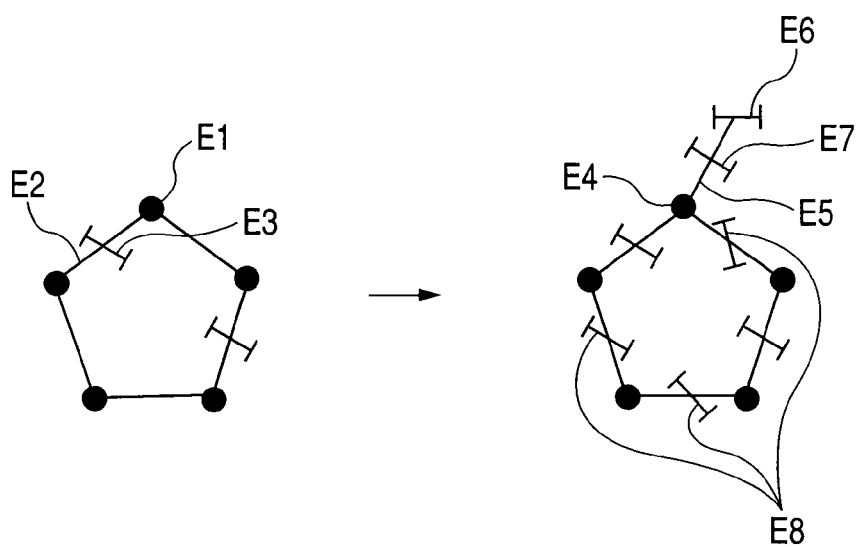

As per the above, although the foregoing description of the embodiment has been directed to the exemplary three-branched mobile mechanism 10 shown in FIG. 1, the present invention is not limited to this, but it may be applied to arrangements in which a plurality of members are connected in a row using joints as shown in FIGS. 9A, 9B, 10A, 10B, 10C, 11, 14 and 15, arrangements in which a plurality of members are connected by joints in such a way as to form a closed loop as shown in FIGS. 12A and 12B, arrangements in which a plurality of members are connected by a coaxially provided joint as shown in FIGS. 9C and 13A, 13B and 13C and arrangements formed by combining the above described arrangements appropriately using an additional member(s). It is apparent that in the arrangements shown in these drawings, the position of the base and the link members may be exchanged.

Although the foregoing description of the embodiment has been directed to the exemplary arrangement in which steering mechanisms are provided on the base 1 and all the links 3A, 3B and 3C (or on all the members) as shown in FIG. 1, the present invention is not limited to this. The present invention can be applied to any arrangement having a plurality of members connected via joints that are at least moved or rotated by causing said plurality of members to swing about pivot axes provided by the joints and have a steering mechanism provided on at least one of the aforementioned plurality of members that enables steering of a passive element relative to the corresponding member. Therefore, it is not necessary to provide steering mechanisms on all the members, but the present invention can be applied to arrangements having one or more steering mechanisms provided on every two successive members, every tree or more successive members, as shown in FIGS. 9A, 9C, 10B, 10C, 11, 12B, 14 and 15 etc. The present invention can also be applied to arrangements in which a member or a series of members equipped with a steering mechanism and a member or a series of members equipped with no steering mechanism are arranged alternately.

In the above described embodiment, it has been demonstrated that by assuming the presence of virtual mechanical elements, the kinematic equations of the mobile mechanism can be converted into multi-chain, single-generator chained form. In the following, some modifications will be presented.

The virtual steering mechanism according to the present invention is a concept including a first virtual steering mechanism and a second virtual steering mechanism, where the first virtual steering mechanism refers to one virtually provided on a virtual member, and in the case that a first virtual steering mechanism as such is provided, the second virtual steering mechanism refers to one virtually provided on an actually existing member. Furthermore, the virtual passive element according to the present invention is a concept including a first virtual passive element and a second virtual passive element, where the first virtual passive element refers to one virtually provided on a virtual member, and in the case that a first virtual passive element as such is provided, the second virtual passive element refers to one virtually provided on an actually existing member.

Figure 9A:
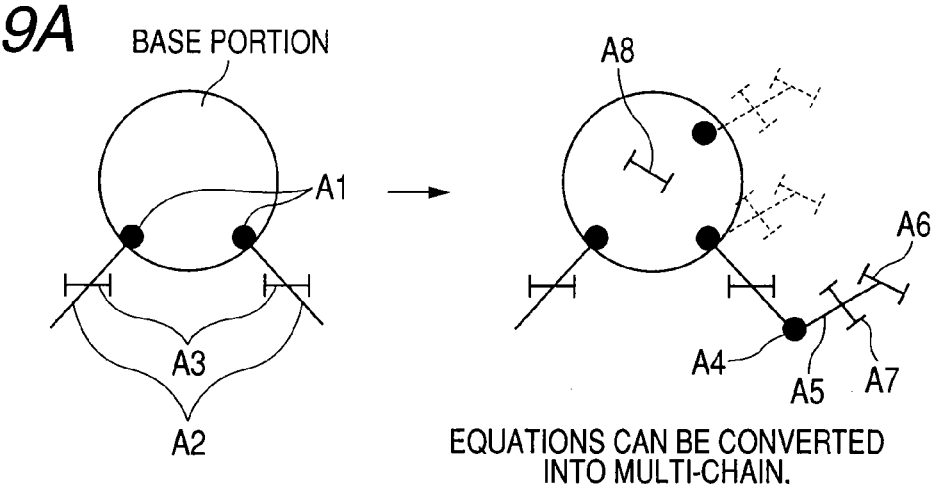
FIG. 9A shows a modification according to the present invention and a virtual base portion steering mechanism, a virtual joint, a virtual link, a virtual axle, a virtual wheels mounted on the virtual axle and a virtual steering mechanism that are imaginarily introduced into the modification.

In FIG. 9A, reference sign A1 designates a joint, reference sign A2 designates a link member and reference sign A3 designates a link portion steering mechanism provided on the link member. In the arrangement shown in FIG. 9A, member A4, member A5, member A6, member A7 and member A8 respectively constitute a virtual joint, a virtual member, a first virtual steering mechanism, a first virtual passive element and a second virtual steering mechanism that are imaginarily introduced in the control method according to the present invention. In this way, by introducing the virtual mechanical elements shown in the drawing on the right of the arrow in FIG. 9A, it is possible to convert the kinematic equations of the mobile mechanism shown in the drawing on the left of the arrow in FIG. 9A into multi-chain, single-generator chained form. In making it possible to convert the kinematic equations of the mobile mechanism into multi-chain, single-generator chained form, the above-mentioned elements A4, A5, A6 and A7 may alternatively be provided, for example, at the positions shown by dotted lines in the drawing on the right of the arrow in FIG. 9A. In other words, the above-mentioned element A4 may be provided on some portion of the plurality of members (that is, in this case, the base A2) or on any joint A1.

Figure 9B:
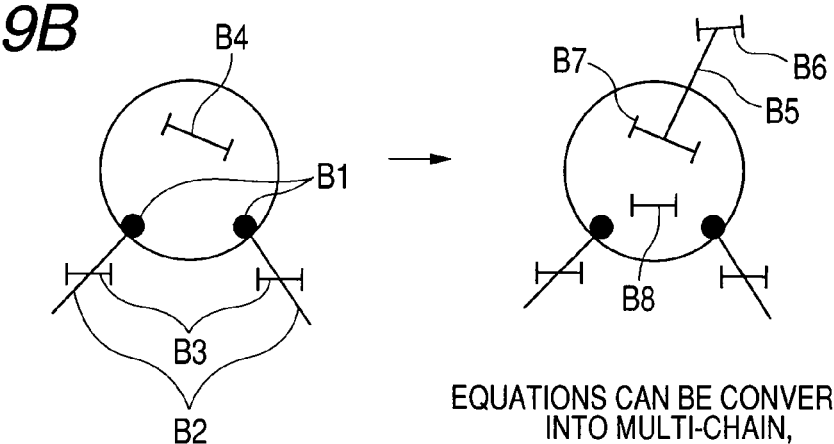
FIG. 9B shows another modification according to the present invention and a virtual link, a virtual steering mechanism, a virtual passive element and a virtual base portion steering mechanism that are imaginarily introduced into the modification.
Figure 9C:
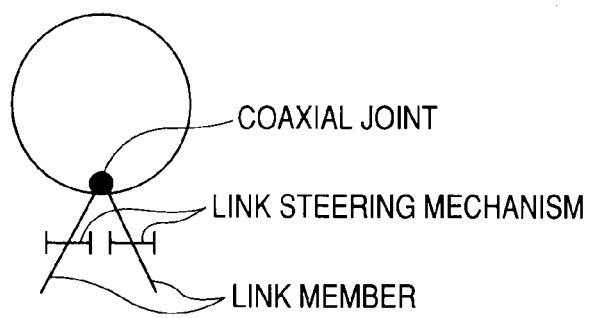
FIG. 9C shows a further modification of the present invention, where a plurality of members are attached via a coaxially provided joint.
Figure 10A:
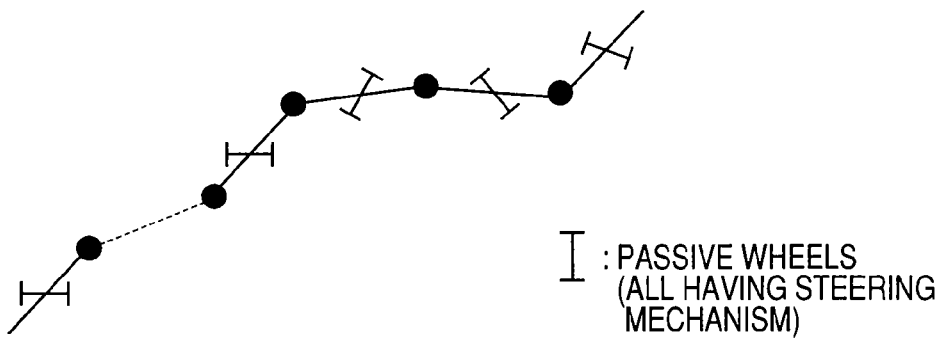
FIGS. 10A, 10B and 10C show still further modifications according to the present invention, or a mobile mechanism in which a plurality of link members are connected in a row.
Figure 10B:
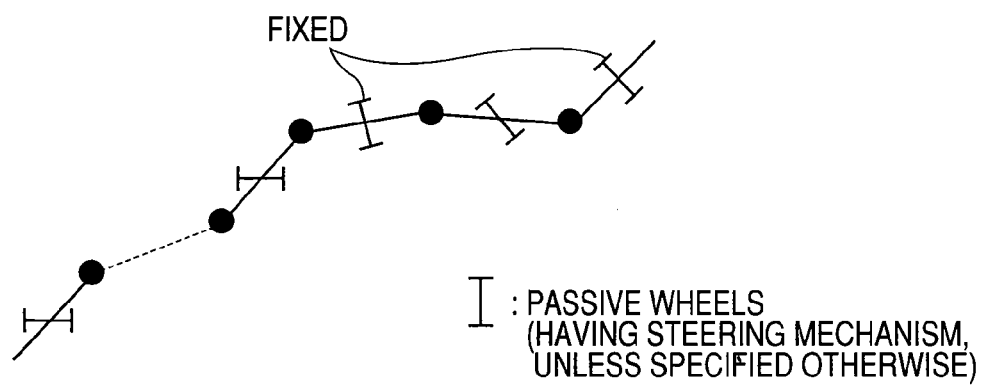
Figure 10C:
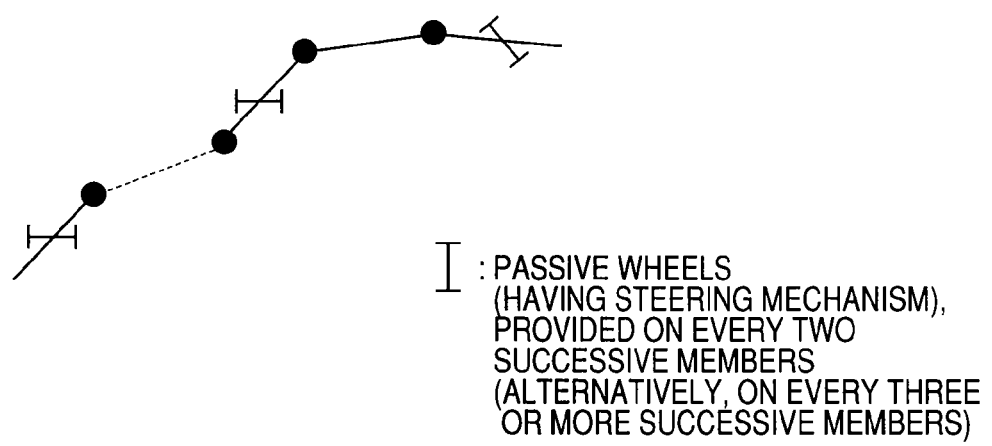

The control method for a mobile mechanism according to the present invention can also be applied to the arrangement shown in FIG. 9B, since what provides steering of a passive element of one steering mechanism can be replaced in calculation by a virtual joint, a virtual member can be fixed in calculation on the passive element of said one steering mechanism, the passive element of said one steering mechanism on which said virtual member can be fixed in calculation can be replaced in calculation by a first virtual passive element, and a member on which said one steering mechanism is provided can be replaced in calculation by a member on which neither a steering mechanism nor a passive element is provided.

Specifically, in FIG. 9B, reference sign B1 designates a joint, reference sign B2 designates a link member, reference sign B3 designates a link portion steering mechanism provided on the link member, and reference sign B4 designates a base portion steering mechanism. In this arrangement, in making it possible to convert the kinematic equations of the mobile mechanism into multi-chain, single-generator chained form, what provides steering of the base steering mechanism B4 may be replaced in calculation by a virtual joint, a virtual member B5 may be fixed in calculation on a passive element in the base steering mechanism B4, the passive element in the base steering mechanism B4 may be replaced in calculation by a first passive element B7, a first virtual steering mechanism may be assumed to be provided as B6, and a second virtual steering mechanism may be assumed to be provided on the base portion as B8. In this way, by introducing the virtual mechanical elements shown in the right drawing in FIG. 9B, it is possible to convert the kinematic equations of the mobile mechanism shown in the left drawing in FIG. 9B into multi-chain, single-generator chained form.

In FIG. 11, reference sign C1 designates a joint, reference sign C2 designates a link member, and reference sign C3 designates a link portion steering mechanism provided on the link member. In the arrangement shown in FIG. 11, member C4, member C5, member C6, member C7 and member C8 respectively constitute a virtual joint, a virtual member, a first virtual steering mechanism, a first virtual passive element and a second virtual steering mechanism that are imaginarily introduced in the control method according to the present invention. In this way, by introducing the virtual mechanical elements shown in the drawing below the arrow in FIG. 11, it is possible to convert the kinematic equations of the mobile mechanism shown in the drawing above the arrow in FIG. 11 into multi-chain, single-generator chained form. In connection with this, a second virtual passive element that does not have a steering mechanism may be provided in place of the second virtual steering mechanism C8. In making it possible to convert the kinematic equations of the mobile mechanism into multi-chain, single-generator chained form, the above-mentioned elements C4, C5, C6 and C7 may alternatively be provided at the positions shown by dotted lines in the drawing below the arrow in FIG. 11. In other words, the above-mentioned element C4 may be provided on some portion of the plurality of members (that is, in this case, member C2) or on any joint C1.

In FIG. 12A, reference sign D1 designates a joint, reference sign D2 designates a link member, and reference sign D3 designates a link portion steering mechanism provided on the link member. In the arrangement shown in FIG. 12A, member D4, member D5, member D6 and member D7 respectively constitute a virtual joint, a virtual member, a first virtual steering mechanism and a first virtual passive element that are imaginarily introduced in the control method according to the present invention. In this way, by introducing the virtual mechanical elements shown in the drawing on the right the arrow in FIG. 12A, it is possible to convert the kinematic equations of the mobile mechanism shown in the drawing on the left of the arrow in FIG. 12A into multi-chain, single-generator chained form. In making it possible to convert the kinematic equations of the mobile mechanism into multi-chain, single-generator chained form, the above-mentioned elements D4, D5, D6 and C7 may alternatively be provided at the positions shown by dotted lines in the drawing on the right of the arrow in FIG. 12A. In other words, the above-mentioned element D4 may be provided on some portion of the plurality of members (that is, in this case, member D2) or on any joint D1.

In the case as shown in FIG. 12B where steering mechanisms are not provided to all the members, reference sign E1 designates a joint, reference sign E2 a link member and reference sign E3 designates a link steering member provided on the link member. In this case, member E4, member E5, member E6, member E7 and member E8 respectively constitute a virtual joint, a virtual member, a first virtual steering mechanism, a first virtual passive element and a second virtual steering mechanism that are imaginarily introduced in the control method according to the present invention. In this way, by introducing the virtual mechanical elements shown in the drawing on the right of the arrow in FIG. 12B, it is possible to convert the kinematic equations of the mobile mechanism shown in the drawing on the left of the arrow in FIG. 12B into multi-chain, single-generator chained form. In connection with this, a second virtual passive element that does not have a steering mechanism may be provided in place of the second virtual steering mechanism E8. In making it possible to convert the kinematic equations of the mobile mechanism into multi-chain, single-generator chained form, the above-mentioned element E4 may be provided on some portion of the plurality of members (that is, in this case, member E2) or on any joint E1, as with the arrangement shown in FIG. 12A.

Figure 13A:
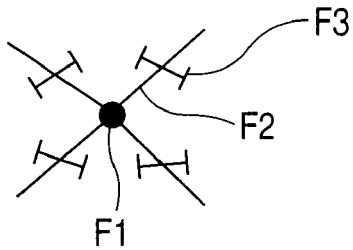
FIGS. 13A, 13B and 13C show an exemplary structure of a mobile mechanism in which a plurality of members are attached to a coaxially provided joint and illustrates conversion of kinematic equations of the mobile mechanism into multi-chain, single-generator chained form.
Figure 13B:
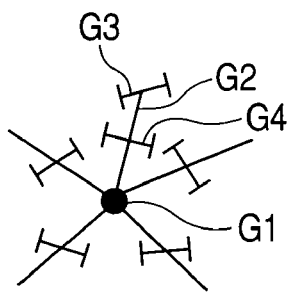
Figure 13C:
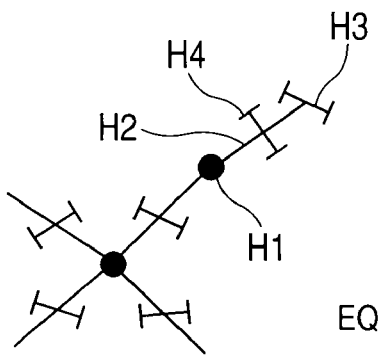

The present invention can be applied to the case as shown in FIG. 13A where a plurality of link members F2 (more than two link members: four in the arrangement shown in FIG. 13A) each having a link portion steering mechanism F3 provided thereon is attached to a coaxially provided joint F1. In this case, as shown in FIG. 13B, member G1, member G2, member G3 and member G4 respectively constitute a virtual joint, a virtual member, a first virtual steering mechanism and a first virtual passive element that are imaginarily introduced in the control method according to the present invention. In this way, by introducing the virtual mechanical elements shown in FIG. 13B, it is possible to convert the kinematic equations of the mobile mechanism shown in FIG. 13A into multi-chain, single-generator chained form. It is also possible to convert the kinematic equations of the mobile mechanism into multi-chain, single-generator chained form by imaginarily introducing the virtual mechanical elements shown in FIG. 13C, where member H1, member H2, member H3 and member H4 respectively constitute a virtual joint, a virtual member, a first virtual steering mechanism and a first virtual passive element. In other words, in the arrangement shown in FIG. 13A also, it is possible to convert the kinematic equations of the mobile mechanism into multi-chain, single-generator chained form by providing a virtual mechanical element on some portion of the plurality of members (that is, in this case, member F2) or on joint F1.

Figure 14:
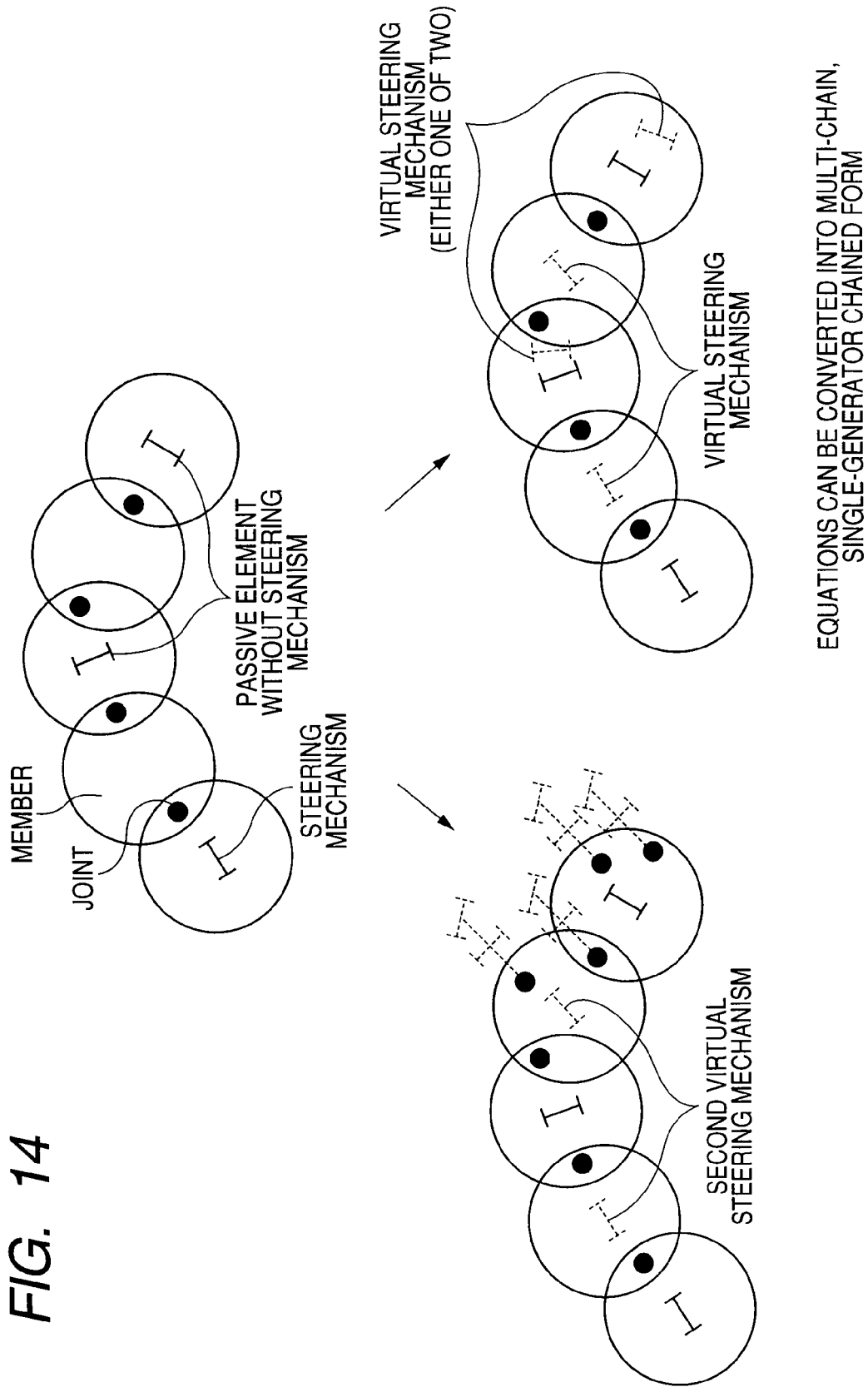
FIG. 14 shows an exemplary structure of a mobile mechanism in which a plurality of members are connected in a row and illustrates conversion of kinematic equations of the mobile mechanism into multi-chain, single-generator chained form.
Figure 15:
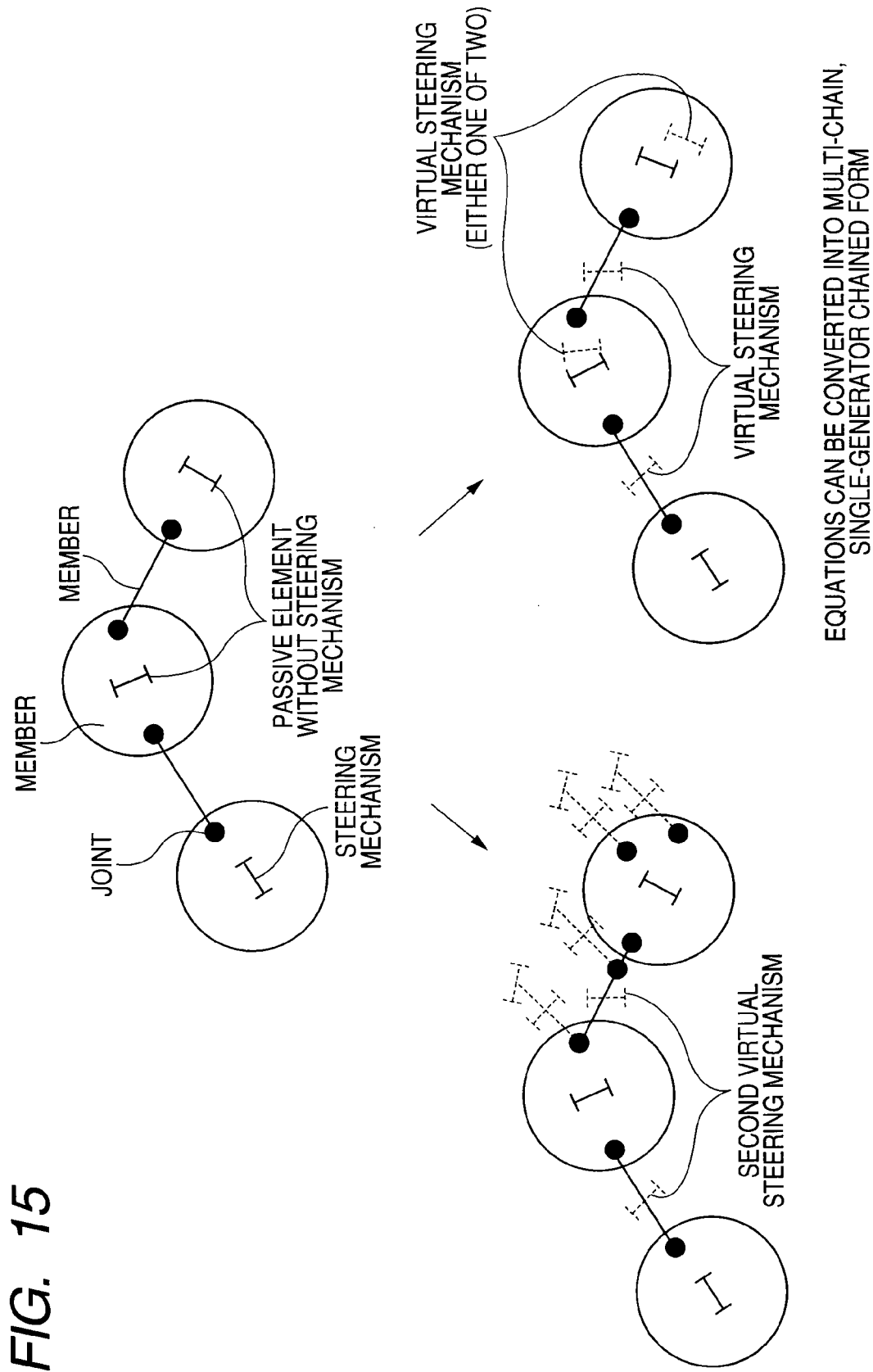
FIG. 15 shows another exemplary structure of a mobile mechanism in which a plurality of members are connected in a row and illustrates conversion of kinematic equations of the mobile mechanism into multi-chain, single-generator chained form.

FIGS. 14 and 15 show mobile mechanisms including a plurality of members connected by joints in which a steering mechanism(s) or a passive element(s) having no steering mechanism is provided on some of the members (at least one steering mechanism is provided).

In these cases, it is possible to convert the kinematic equations of the mobile mechanisms into multi-chain, single-generator chained form by providing virtual joints on some portions of the joint or the members, attaching virtual members via the virtual joints, providing first virtual steering mechanisms and first virtual passive elements to the virtual members and providing second virtual steering mechanisms (or second virtual passive elements) to the members on which neither a passive element without a steering mechanism nor a steering mechanism is provided as shown by the dotted lines in the lower left drawings in FIGS. 14 and 15.

Furthermore, it is also possible to convert the kinematic equations of the mobile mechanisms into multi-chain, single-generator chained form by assuming the presence of virtual steering mechanisms (or virtual passive elements) on the members on which neither a passive element without a steering mechanism nor a steering mechanism is provided and providing a virtual steering mechanism on any one of the members on which a passive element without a steering mechanism is provided as shown by the dotted lines in the lower right drawings in FIGS. 14 and 15.

The control method for a mobile mechanism according to the present invention is not limited to those which have been described in the foregoing, by way of example, as embodiments and modifications, but the scope of the invention covers any control method for a mobile mechanism including a plurality of members connected via joints that is at least moved or rotated by causing the plurality of members to swing about pivot axes provided by the joints and has a steering mechanism provided on at least one of said plurality of members that enables steering of a passive element relative to a corresponding member, comprising making it possible to convert kinematic equations of the mobile mechanism into multi-chain, single-generator chained form by assuming the presence of a virtual mechanical element(s) (i.e. at least one of a virtual joint(s), a virtual member(s), a virtual steering mechanism(s) and a virtual passive element(s) or a combination(s) thereof) attached on the mobile mechanism, and controlling swinging of said member and operation or steering of the passive element of the steering mechanism based on the multi-chain, single-generator chained form.

The present invention is not limited to the arrangements shown by way of example in FIGS. 12A and 12B, but it can be applied to a closed loop link mechanism having six or more joints. In the case of a four-joint links, by driving one joint, the other three joints can also be driven. In the case of a five-joint links, by driving two joints, the other three joints can also be driven. In the case of n-joints links, in analogous with the above cases, by driving (n−3) joints, it is possible to drive the remaining three joints.

Although a control method of a mobile mechanism for causing the mobile mechanism to follow a straight path has been described as an embodiment by way of example, a control method for causing a mobile mechanism to follow other curved paths can also be realized. In other words, it is possible to control a mobile mechanism to perform a predetermined motion (namely, to move and turn). Furthermore, the present invention is not limited to the case where driving of joints and operation of steering mechanisms are controlled by a feedback system based on the position and posture of a mobile mechanism to cause the mobile mechanism to perform a predetermined motion (i.e. to move and turn), but the driving of joints and operation of steering mechanisms may be controlled by a feed-forward system based on a control amount that is determined in advance to realize a predetermined motion.

This application claims priority from Japanese Patent Application No. 2005-185684 filed on May 30, 2005, which is hereby incorporated by reference herein.

What is claimed is:

1. A mobile mechanism comprising:
   a base;
   first wheels configured to support said base and being passively rotatable, wherein turning directions of said first wheels are operable by a first driving mechanism;
   a plurality of joints attached to said base;
   a plurality of members, each of which is attached to a corresponding joint of said plurality of joints, rotatably around said corresponding joint;
   a second driving mechanism which rotates said plurality of members around said plurality of joints, respectively;
   second wheels, each of which is attached to a corresponding member of said plurality of members and passively rotatable, wherein turning directions of said second wheels are operable by a third driving mechanism so that each of said plurality of members is operable; and
   a controller configured to effect a translational movement of said base for performing a feedback control by controlling of steerage of directions of said plurality of members in which each of said plurality of members is rotated around the corresponding joint of said plurality of joints by driving said second driving mechanism, steerage of a turning direction of each of said first wheels by driving said first driving mechanism, and/or steerage of a turning direction of each of said second wheels by driving the third driving mechanism,
   wherein the feedback control in said controller, on a basis of a definition in which an x-axis and a y-axis are perpendicular to each other on a surface on which the mobile mechanism moves, includes controls of the driving of the first, second and third driving mechanisms so that:
   a ratio of a velocity in the x-axis direction to a velocity in the y-axis direction of a portion to which each of said first wheels is attached corresponds to a ratio of a cosine value of a sum of an angle of an orientation of said base with regard to the x-axis and an angle of a turning direction of each of said first wheels with regard to the orientation of said base to a sine value of a sum of an angle of an orientation of said base with regard to the x-axis and an angle of a turning direction of each of said first wheels with regard to the orientation of said base, and
   for each of said plurality of members, a ratio of a velocity in the x-axis direction to a velocity in the y-axis direction of a portion to which each of the corresponding second wheels is attached, corresponds to a ratio of a cosine value of a sum of an angle of an orientation of the member with regard to the x-axis and an angle of a turning direction of each of the corresponding second wheels with regard to the orientation of said base to a sine value of a sum of an angle of an orientation of the member with regard to the x-axis and an angle of a turning direction of each of the corresponding second wheels with regard to the orientation of the member.

2. A control method of controlling a mobile mechanism, said mobile mechanism comprising:
   a base;
   first wheels configured to support said base and being passively rotatable, wherein turning directions of said first wheels are operable by a first driving mechanism;
   a plurality of joints attached to said base;
   a plurality of members, each of which is attached to a corresponding joint of said plurality of joints rotatably around said corresponding joint;
   a second driving mechanism which rotates said plurality of members around said plurality of joints, respectively; and
   second wheels, each of which is attached to a corresponding member of said plurality of members and passively rotatable, wherein turning directions of said second wheels are operable by a third driving mechanism so that each of said plurality of members is operable,
   wherein on a basis of a definition in which an x-axis and a y-axis are perpendicular to each other on a surface on which the mobile mechanism moves, said method comprises:
   controlling steerage of directions of said plurality of members in which each of said plurality of members is rotated around the corresponding joint of said plurality of joints by driving said second driving mechanism, steerage of a turning direction of said first wheels by driving said first driving mechanism, and/or steerage of a turning direction of each of said second wheels by driving the third driving mechanism so as to effect a translational movement of said base, so that:
   a ratio of a velocity in the x-axis direction to a velocity in the y-axis direction of a portion to which each of said first wheels is attached corresponds to a ratio of a cosine value of a sum of an angle of an orientation of said base with regard to the x-axis and an angle of a turning direction of each of said first wheels with regard to the orientation of said base to a sine value of a sum of an angle of an orientation of said base with regard to the x-axis and an angle of a turning direction of each of said first wheels with regard to the orientation of said base, and for each of said plurality of members, a ratio of a velocity in the x-axis direction to a velocity in the y-axis direction of a portion to which the corresponding second wheels is attached, corresponds to a ratio of a cosine value of a sum of an angle of an orientation of the member with regard to the x-axis and an angle of a turning direction of each of the corresponding second wheels with regard to the orientation of said base to a sine value of a sum of an angle of an orientation of the member with regard to the x-axis and an angle of a turning direction of each of the corresponding second wheels with regard to the orientation of the member.

* * * * *